US009042688B2

(12) United States Patent
Pushkarsky et al.

(10) Patent No.: US 9,042,688 B2
(45) Date of Patent: May 26, 2015

(54) MULTIPLE PORT, MULTIPLE STATE OPTICAL SWITCH

(75) Inventors: Michael Pushkarsky, San Diego, CA (US); Bradley Charles Steele, San Diego, CA (US); Kyle Jay Laudner, El Cajon, CA (US); Christopher Edward Hatch, San Diego, CA (US)

(73) Assignee: DAYLIGHT SOLUTIONS, INC., San Diego, CA (US)

( * ) Notice: Subject to any disclaimer, the term of this patent is extended or adjusted under 35 U.S.C. 154(b) by 429 days.

(21) Appl. No.: 13/359,346

(22) Filed: Jan. 26, 2012

(65) Prior Publication Data
US 2013/0022311 A1    Jan. 24, 2013

Related U.S. Application Data

(60) Provisional application No. 61/436,541, filed on Jan. 26, 2011.

(51) Int. Cl.
G02B 6/26    (2006.01)
G02B 6/42    (2006.01)

(52) U.S. Cl.
CPC ................... G02B 6/4201 (2013.01)

(58) Field of Classification Search
CPC .... G02B 6/3512; G02B 6/3546; G02B 6/356; G02B 6/3556; G02B 6/35
USPC ............ 385/15, 16, 17, 18, 19, 20, 21, 22, 23
See application file for complete search history.

(56) References Cited

U.S. PATENT DOCUMENTS

| 2,684,015 | A | 7/1954 | Grey |
| 3,782,832 | A | 1/1974 | Hacskaylo |
| 4,266,873 | A | 5/1981 | Hacskaylo |
| 4,470,662 | A | 9/1984 | Mumzhiu |
| 4,555,627 | A | 11/1985 | McRae, Jr. |
| 4,656,641 | A | 4/1987 | Scifres et al. |
| 4,737,028 | A | 4/1988 | Smith |
| 4,745,276 | A | 5/1988 | Broicher et al. |

(Continued)

FOREIGN PATENT DOCUMENTS

| DE | 10205310 A1 | 9/2003 |
| EP | 0877 454 A1 | 11/1998 |

(Continued)

OTHER PUBLICATIONS

Weida et al., Utilizing broad gain bandwidth in quantum cascade devices, Nov. 2010, vol. 49 (11) Optical Engineering, 111120, 0091-3286/2010 ©2010 SPIE.

(Continued)

*Primary Examiner* — Jennifer Doan
(74) *Attorney, Agent, or Firm* — Roeder & Broder LLP

(57) ABSTRACT

An optical switch (16) for alternatively redirecting a source beam (14) includes a director assembly (18) that is selectively moveable between (i) a first switch position (350), (ii) a second switch position (352), and (iii) a dual switch position (354). In the first switch position (350), the source beam (14) passes to a first port (36). In the second switch position (352), the source beam (14) is directed to a second port (38). In the dual switch position (354), the director assembly (18) splits the source beam (14) into a first beam part (314A) that is directed to the first port (36), and a second beam part (314B) that is directed to the second port (38).

20 Claims, 9 Drawing Sheets

(56) References Cited

U.S. PATENT DOCUMENTS

| | | |
|---|---|---|
| 4,772,789 A | 9/1988 | Maram et al. |
| 4,796,266 A | 1/1989 | Banwell et al. |
| 4,852,956 A | 8/1989 | Kramer |
| 4,871,916 A | 10/1989 | Scott |
| 5,005,934 A | 4/1991 | Curtiss |
| 5,050,176 A | 9/1991 | Naito et al. |
| 5,056,097 A | 10/1991 | Meyers |
| 5,064,988 A | 11/1991 | E'nama et al. |
| 5,068,867 A | 11/1991 | Hasenberg et al. |
| 5,082,339 A | 1/1992 | Linnebach |
| 5,082,799 A | 1/1992 | Holmstrom et al. |
| 5,118,186 A | 6/1992 | Schraetzenstaller et al. |
| 5,140,599 A | 8/1992 | Trutna, Jr. et al. |
| 5,161,408 A | 11/1992 | McRae et al. |
| 5,172,390 A | 12/1992 | Mooradian |
| 5,181,214 A | 1/1993 | Berger et al. |
| 5,208,417 A | 5/1993 | Langer et al. |
| 5,225,679 A | 7/1993 | Clarke et al. |
| 5,255,073 A | 10/1993 | Wallin et al. |
| 5,264,368 A | 11/1993 | Clarke et al. |
| 5,315,436 A | 5/1994 | Lowehnar et al. |
| 5,331,651 A | 7/1994 | Becker et al. |
| 5,355,609 A | 10/1994 | Schenke |
| 5,430,293 A | 7/1995 | Sato et al. |
| 5,457,709 A | 10/1995 | Capasso et al. |
| 5,476,385 A | 12/1995 | Parikh et al. |
| 5,491,714 A | 2/1996 | Kitamura |
| 5,523,569 A | 6/1996 | Hornfeld et al. |
| 5,537,432 A | 7/1996 | Mehuys et al. |
| 5,656,813 A | 8/1997 | Moore et al. |
| 5,662,819 A | 9/1997 | Kadomura |
| 5,671,561 A | 9/1997 | Johnson et al. |
| 5,685,636 A | 11/1997 | German |
| 5,751,830 A | 5/1998 | Hutchinson |
| 5,752,100 A | 5/1998 | Schrock |
| 5,780,724 A | 7/1998 | Olender et al. |
| 5,824,884 A | 10/1998 | Olender et al. |
| 5,834,632 A | 11/1998 | Olender et al. |
| 5,854,422 A | 12/1998 | McKeon et al. |
| 5,862,162 A | 1/1999 | Maeda |
| 5,866,073 A | 2/1999 | Sausa et al. |
| 5,892,617 A | 4/1999 | Wallace |
| 6,089,076 A | 7/2000 | Mueller et al. |
| 6,134,257 A | 10/2000 | Capasso et al. |
| 6,154,307 A | 11/2000 | Veronesi et al. |
| 6,157,033 A | 12/2000 | Chudnovsky |
| 6,192,064 B1 | 2/2001 | Algots et al. |
| 6,243,404 B1 | 6/2001 | Joyce |
| 6,326,646 B1 | 12/2001 | Baillargeon et al. |
| 6,327,896 B1 | 12/2001 | Veronesi et al. |
| 6,363,648 B1 | 4/2002 | Kranich et al. |
| 6,400,744 B1 | 6/2002 | Capasso et al. |
| 6,431,732 B1 | 8/2002 | Brown et al. |
| 6,470,036 B1 | 10/2002 | Bailey et al. |
| 6,483,978 B1 | 11/2002 | Gao et al. |
| 6,501,869 B1 * | 12/2002 | Athale .................. 385/18 |
| 6,553,045 B2 | 4/2003 | Kaspi |
| 6,575,641 B2 | 6/2003 | Yamabayashi et al. |
| 6,578,311 B2 | 6/2003 | Danielson et al. |
| 6,608,847 B2 | 8/2003 | Zhang et al. |
| 6,616,452 B2 | 9/2003 | Clark et al. |
| 6,636,539 B2 | 10/2003 | Martinsen |
| 6,678,429 B2 | 1/2004 | Mossberg et al. |
| 6,690,472 B2 | 2/2004 | Kulp et al. |
| 6,714,564 B1 | 3/2004 | Meyers |
| 6,782,162 B2 | 8/2004 | Fukuzawa et al. |
| 6,803,577 B2 | 10/2004 | Edner et al. |
| 6,823,115 B2 | 11/2004 | Greiner et al. |
| 6,829,417 B2 | 12/2004 | Greiner et al. |
| 6,856,717 B2 | 2/2005 | Kilian |
| 6,859,318 B1 | 2/2005 | Mossberg |
| 6,859,481 B2 | 2/2005 | Zheng |
| 6,866,089 B2 | 3/2005 | Avila |
| 6,879,441 B1 | 4/2005 | Mossberg |
| 6,885,965 B2 | 4/2005 | Butler et al. |
| 6,909,539 B2 | 6/2005 | Korniski et al. |
| 6,961,491 B2 | 11/2005 | Greiner et al. |
| 6,965,464 B2 | 11/2005 | Mossberg |
| 6,965,716 B2 | 11/2005 | Greiner et al. |
| 6,985,656 B2 | 1/2006 | Iazikov et al. |
| 6,987,911 B2 | 1/2006 | Mossberg et al. |
| 6,990,276 B2 | 1/2006 | Brice et al. |
| 6,993,223 B2 | 1/2006 | Greiner et al. |
| 6,995,846 B2 | 2/2006 | Kalayeh et al. |
| 7,009,743 B2 | 3/2006 | Mossberg |
| 7,032,431 B2 | 4/2006 | Baum et al. |
| 7,051,469 B1 | 5/2006 | Pochapsky et al. |
| 7,054,517 B2 | 5/2006 | Mossberg et al. |
| 7,061,022 B1 | 6/2006 | Pham et al. |
| 7,062,128 B2 | 6/2006 | Mossberg |
| 7,063,260 B2 | 6/2006 | Mossberg et al. |
| 7,088,076 B2 | 8/2006 | Densham et al. |
| 7,116,453 B2 | 10/2006 | Mossberg |
| 7,120,334 B1 | 10/2006 | Greiner et al. |
| 7,123,794 B2 | 10/2006 | Greiner et al. |
| 7,151,787 B2 | 12/2006 | Kulp et al. |
| 7,181,103 B1 | 2/2007 | Greiner et al. |
| 7,189,970 B2 | 3/2007 | Racca et al. |
| 7,190,856 B1 | 3/2007 | Iazikov et al. |
| 7,190,858 B1 | 3/2007 | Greiner et al. |
| 7,190,859 B2 | 3/2007 | Greiner et al. |
| 7,194,164 B2 | 3/2007 | Iazikov et al. |
| 7,203,401 B2 | 4/2007 | Mossberg et al. |
| 7,224,855 B2 | 5/2007 | Iazikov et al. |
| 7,224,867 B2 | 5/2007 | Mossberg |
| 7,231,862 B1 | 6/2007 | Quinn |
| 7,260,290 B1 | 8/2007 | Greiner et al. |
| 7,265,842 B2 | 9/2007 | Paldus et al. |
| 7,286,732 B2 | 10/2007 | Greiner et al. |
| 7,292,755 B1 | 11/2007 | Greiner et al. |
| 7,325,318 B2 | 2/2008 | Roes |
| 7,325,354 B2 | 2/2008 | Grauslys et al. |
| 7,327,908 B1 | 2/2008 | Iazikov et al. |
| 7,330,614 B1 | 2/2008 | Mossberg et al. |
| 7,333,692 B1 | 2/2008 | Mossberg et al. |
| 7,341,189 B2 | 3/2008 | Mossberg et al. |
| 7,345,277 B2 | 3/2008 | Zhang |
| 7,349,599 B1 | 3/2008 | Iazikov et al. |
| 7,358,498 B2 | 4/2008 | Geng et al. |
| 7,359,597 B1 | 4/2008 | Iazikov et al. |
| 7,424,042 B2 | 9/2008 | Day et al. |
| 7,429,734 B1 | 9/2008 | Tidwell |
| 7,466,734 B1 | 12/2008 | Day et al. |
| 7,490,430 B2 | 2/2009 | Staley |
| 7,492,806 B2 | 2/2009 | Day et al. |
| 7,505,119 B2 | 3/2009 | Rogers |
| 7,535,656 B2 | 5/2009 | Day et al. |
| 7,535,936 B2 | 5/2009 | Day et al. |
| 7,559,169 B2 | 7/2009 | Hung et al. |
| 7,590,316 B2 | 9/2009 | Dames |
| 7,623,234 B2 | 11/2009 | Puzey |
| 7,732,767 B2 | 6/2010 | Houde-Walter |
| 7,733,925 B2 | 6/2010 | Pushkarsky et al. |
| 7,753,549 B2 | 7/2010 | Solinsky et al. |
| 7,755,041 B2 | 7/2010 | Killinger et al. |
| 7,796,341 B2 | 9/2010 | Day et al. |
| 7,818,911 B2 | 10/2010 | Houde-Walter |
| 7,826,503 B2 | 11/2010 | Day et al. |
| 7,848,382 B2 | 12/2010 | Weida et al. |
| 7,873,094 B2 | 1/2011 | Day et al. |
| 7,920,608 B2 | 4/2011 | Marsland, Jr. et al. |
| 8,027,094 B2 | 9/2011 | Day et al. |
| 8,050,307 B2 | 11/2011 | Day et al. |
| 8,068,521 B2 | 11/2011 | Weida et al. |
| 8,335,413 B2 * | 12/2012 | Dromaretsky et al. .......... 385/36 |
| 2002/0024979 A1 | 2/2002 | Vilhelmsson et al. |
| 2002/0064198 A1 | 5/2002 | Koizumi |
| 2002/0090013 A1 | 7/2002 | Murry et al. |
| 2002/0105699 A1 | 8/2002 | Miracky et al. |
| 2002/0150133 A1 | 10/2002 | Aikiyo et al. |
| 2002/0176473 A1 | 11/2002 | Mouradian |
| 2003/0043877 A1 | 3/2003 | Kaspi |
| 2003/0063633 A1 | 4/2003 | Zhang et al. |
| 2003/0095346 A1 | 5/2003 | Nasu et al. |

(56) References Cited

U.S. PATENT DOCUMENTS

| | | |
|---|---|---|
| 2003/0123495 A1 | 7/2003 | Cox |
| 2003/0127596 A1 | 7/2003 | Kosterev et al. |
| 2003/0174315 A1 | 9/2003 | Byren et al. |
| 2003/0179183 A1 | 9/2003 | Pilgrim et al. |
| 2003/0198274 A1 | 10/2003 | Lucchetti |
| 2004/0013154 A1 | 1/2004 | Zheng |
| 2004/0032891 A1 | 2/2004 | Ikeda et al. |
| 2004/0095579 A1 | 5/2004 | Bisson et al. |
| 2004/0165640 A1 | 8/2004 | Clifford et al. |
| 2004/0208602 A1 | 10/2004 | Plante |
| 2004/0228371 A1 | 11/2004 | Kolodzey et al. |
| 2004/0238811 A1 | 12/2004 | Nakamura et al. |
| 2004/0264523 A1 | 12/2004 | Posamentier |
| 2005/0083568 A1 | 4/2005 | Nakae et al. |
| 2005/0105566 A1 | 5/2005 | Sacher |
| 2005/0199869 A1 | 9/2005 | Shi |
| 2005/0213627 A1 | 9/2005 | Masselink et al. |
| 2005/0237524 A1 | 10/2005 | Kamei |
| 2006/0056466 A1 | 3/2006 | Belenky et al. |
| 2006/0214107 A1 | 9/2006 | Mueller |
| 2006/0262316 A1 | 11/2006 | Baney |
| 2006/0268947 A1 | 11/2006 | Kalayeh |
| 2007/0019702 A1 | 1/2007 | Day et al. |
| 2007/0030865 A1 | 2/2007 | Day et al. |
| 2007/0047599 A1 | 3/2007 | Wysocki et al. |
| 2007/0209268 A1 | 9/2007 | Birurakis et al. |
| 2007/0291804 A1 | 12/2007 | Day et al. |
| 2008/0075153 A1 | 3/2008 | Day et al. |
| 2008/0231719 A1 | 9/2008 | Benson |
| 2008/0298406 A1 | 12/2008 | Day et al. |
| 2008/0304524 A1 | 12/2008 | Marsland et al. |
| 2009/0015914 A1 | 1/2009 | Duncan et al. |
| 2009/0159798 A1 | 6/2009 | Weida et al. |
| 2009/0213882 A1 | 8/2009 | Weida et al. |
| 2009/0257709 A1 | 10/2009 | Dames |
| 2009/0262768 A1 | 10/2009 | Day et al. |
| 2010/0110198 A1 | 5/2010 | Larson et al. |
| 2010/0132581 A1 | 6/2010 | Day et al. |
| 2010/0229448 A1 | 9/2010 | Houde-Walter et al. |
| 2010/0243891 A1 | 9/2010 | Day et al. |
| 2010/0302796 A1 | 12/2010 | Pushkarsky et al. |
| 2011/0006229 A1 | 1/2011 | Day et al. |
| 2011/0080311 A1 | 4/2011 | Pushkarsky et al. |
| 2011/0222566 A1 | 9/2011 | Weida et al. |
| 2011/0233409 A1 | 9/2011 | Weida et al. |

FOREIGN PATENT DOCUMENTS

| | | |
|---|---|---|
| EP | 0 883 220 A2 | 12/1998 |
| EP | 2 081 265 A3 | 9/2009 |
| EP | 2 113 975 A2 | 11/2009 |
| EP | 2256528 A1 | 12/2010 |
| GB | 2286901 A | 8/1995 |
| JP | 55087107 A | 7/1980 |
| JP | 58072108 | 4/1983 |
| JP | 03-048480 A | 3/1991 |
| JP | 07-024322 B | 1/1995 |
| JP | 2005317819 A | 11/2005 |
| WO | WO9220127 A1 | 11/1992 |
| WO | WO9321843 | 11/1993 |
| WO | WO 03/067720 A2 | 8/2003 |
| WO | WO2006045303 A2 | 5/2006 |
| WO | WO2008010966 A2 | 1/2008 |
| WO | WO2008036881 A2 | 3/2008 |
| WO | WO2008036884 A2 | 3/2008 |

OTHER PUBLICATIONS

File:LED, 5mm, green (en).svg-Wikipedia, the free encyclopedia, Description English: A labeled drawing of a 5mm round (the "normal" type) LED. Apr. 6, 2009, 3 pages, http://en.wikipedia.org/wiki/File:LED,_5mm,_green(en).svg.

Martini, Ranier et al.,"High duty cycle operation of quantum cascade lasers based on graded superlattice active regions," Journal of Applied Physics, Jun. 15, 2001, pp. 7735-7738, vol. 89, No. 12, XP012052642 ISSN:0021-8979, ©2001 American Institute of Physics.

Sirtori, Carlo et al., "Mid-Infrared (8.5 μm) Semiconductor Lasers Operating at Room Temperature,"IEEE Photonics Technology Letters, Mar. 1997, pp. 297-299, vol. 9, No. 3, XP000684396, ISN:1041-1135, ©1997 IEE.

W.Y. Oh et al, "115 kHz tuning repetition rate ultrahigh-speed wavelength-swept semiconductor laser", received Apr. 11, 2005, accepted Aug. 9, 2005, pp. 3159-3163, vol. 30, No. 23, Optics Letters, ©2005 Optical Society of America.

Weida et al., "Tunable QC laser opens up mid-IR sensing applications," Jul. 2006, pp. 1-5, Laser Focus World, http://www.optoiq.com/index/photonics-technologies-applications/lfw-display/lfw-articles-tools-template/_pr . . . .

G.P. Luo et al.,Grating-tuned external-cavity quantum-cascade semiconductor lasers, May 7, 2001, Applied Physics Letters, vol. 78, No. 19, ©2001 American Institute of Physics.

G. Wysocki et al.,Widely tunable mode-hop free external cavity quantum cascade laser for high resolution spectroscopic applications, Jul. 27, 2005, Applied Physics, B81, pp. 769-777, Applied Physics B Lasers and Optics.

Day et al., Minaturized External Cavity Quantum Cascade Lasers for Broad Tunability in the Mid-Infrared, May 21, 2006, 1-55752-813-6, Lasers and Electro-Optics and 2006 Quantum Electronics and Laser Science Conference, ©2006 IEEE.

G. Totschig et al.,Mid-infrared external-cavity quantum-cascade laser XP-001161786, Oct. 15, 2002, pp. 1788-1790, OPTICS LETTERS/vol. 27, No. 20, ©2002 Optical Society of America.

Thierry Aellen et al., Continuous-wave distributed-feedback quantum-cascade lasers on a Peltier cooler, Sep. 8, 2003, pp. 1929-1931, Applied Physics Letters, vol. 83, No. 10, ©2003 American Institute of Physics.

D. Weidmann et al., Development of a compact quantum cascade laser spectrometer for field measurements of CO 2 isotopes, Feb. 1, 2005, pp. 255-260, Applied PhysicsB, Lasers and Optics, Appl. Phys. B 80, published online: Sep. 29, 2004 © Springer-Verlag 2004.

Cassidy et al., Short-external-cavity module for enhanced single-mode tuning of InGaAsP and AIGaAs semiconductor diode lasers, Oct. 1991, No. 10, pp. 2385-2388, ©1991 American Institute of Physics.

M.G. Littman, H.J. Metcalf: "Spectrally narrow pulse dye laser without beam expander" Applied Optics, vol. 17, No. 14, Jul. 15, 1978, pp. 2224-2227, XP002528173 US.

Patrick McNicholl and Harold J. Metcalf, Synchronous cavity mode and feedback wavelength scanning in dye laser oscillators with gratings, Sep. 1, 1985, pp. 2757-2761, vol. 24, No. 17, Applied Optics, ©1985 Optical Society of America.

Victor Rudometov and Eugene Rudometrov, Peltier Coolers, May 11, 2005, pp. 1-11, http://www.digit-life.com/article/peltiercoolers.com/ ©Digit-Life.com 1997-2004.

T Topfer, KP Petrov, Y Mine, D Jundt, RF Curl, and FK Tittel, Room-temperature mid-infrared laser sensor for trace gas detection, Applied Optics, Oct. 20, 1997, pp. 8042-8049, vol. 36 No. 30, Oct. 20, 1997/Applied Optics.

Cavity Enhancing Sensors using QC Lasers, Jun. 7, 2005, pp. 1-6, http://www.infrared.phl.gov/enhanced.sensors.html, Webmaster: Pamela Kinsey, Reviewed: Nov. 23, 2004.

Transient FM Absorption Spectroscopy, Jun. 7, 2005, pp. 1 and 2, http://www.chem/tamu.edu/group/north/FM.html.

FM Spectroscopy With Tunable Diode Lasers, Application Note 7, pp. 1-10, New Focus Copyright 2001.

John Andrews and Paul Dalin,Frequency Modulation Spectroscopy, Dec. 2005, pp. 24-26, http://www.spectroscopyeurope.com.

R.F. Curl and F.K. Tittel, Tunable infrared laser spectroscopy, 1998, pp. 219-272, Annu. Rep. Prog-Chem. Sect. C, 2002.

Shawn Wehe et al., AIAA 2002-0824 Measurements of Trace Pollutants in Combustion Flows Using Room-Temperature, Mid-IR Quantum Cascade Lasers , S. Wehe, et al. (Physical Sciences, Inc.) C Gmachl and F Capasso (Bell Lab., Lucent Technologies), Jan. 2002, cover and pp. 1-7, 40th AIAA Aerospace Sciences Meeting and Exhibit 14, Jan. 17, 2002, Reno, NV.

(56) References Cited

OTHER PUBLICATIONS

W. Huang, RRA Syms, J. Stagg and A.A. Lohmann, Precision MEMS Flexure mount for a Littman tunable external cavity laser, Mar. 2004, pp. 67-75, IEE Prc-Sci Meas. Technol vol. 151, No. 2 Mar. 2004.

K. Namjou, S. Cai, E.A. Whitaker, J. Faist, C. Gmacahi, F. Capasso, D.L. Sivco and A.Y. Cho,Sensitive absorption spectroscopy with a room-temperature distributed-feedback quantum-cascade laser, 1998, pp. 219-221, 1998 Optical Society of America.

Gregory E. Hall and Simon W. North, Transient Laser Frequency Modulation Spectroscopy, 2000, pp. 243-274, Annu. Rev.Phys. Chem. 2000.51:243-74-Copyright 2000.

External-cavity quantum-cascade lasers, May 11, 2005, pp. 1-4, http://www.unine.ch/phys/meso/EC/EC.html.

Frequency stabilization of diode lasers, May 30, 2005, pp. 1-17, Santa Chawla—National Physical Laboratory, http://www.ias.ac.in/currsci/jan25/articles41.htm, National Physical Lab, New Delhi 110 012 India.

R.A. Syms, A. Lohmann, Moems tuning Element for a Littrow External Cavity Laser, Dec. 2003, pp. 921-928, Journal of Microelectromechanical Systems, vol. 12, No. 6 Dec. 2003.

A.A. Koserev et al., Thermoelectrically cooled quantum cascade laser based sensor for continuous monitoring of ambient atmosperic CO—AA Koserev, FK Tittel, R Kohler, C Gmachi, F Capasso, DL Sivco, AY Cho, S Wehe and M Allen, 2002, cover and pp. 1-16, Copyright 2002 Optical Society of America (Provided in parent U.S. Appl. No. 11/154,264).

Cooke, M., Producing more light than heat from quantum cascade lasers, published on-line Jan. 10, 2010, www.semiconductor-today.com, Semiconductor Today, vol. 5, Issue 1, pp. 106-107, Feb. 2010.

Lincoln Laboratory, News, MIT Lincoln Laboratory creates bright diode lasers, posted on-line Oct. 2009, pp. 1-2, MIT Lincoln Laboratory:News: MIT Lincoln Laboratory creates bright diode lasers, ©2011 Lincoln Laboratory, Massachusetts Institute of Technology.

Lincoln Laboratory, Publications, Lab Notes, Laser Technology, A Bright Idea, Simple tweaks turn into tiny diode lasers into powerhouses, posted on-line Jun. 2010, pp. 1-3, MIT Lincoln Laboratory:Lab Note: A Bright Idea, ©2011 Lincoln Laboratory, Massachusetts Institute of Technology.

Michael Hacskaylo, "Laser Aiming Light," Army Electronics Command Fort Belvoir, VA Night Vision Lab, Jan. 1974, 26 pages, US Department of Commerce, Technology Administration, National Technical Information Service, Springfield, VA 22161.

Lawrence T. Marshall et al., "Integrated Sight," CECOM RDEC Night Vision and Electronic Sensors Directorate, Fort Belvoir, VA, Texas Instruments, Inc., Plano, TX, Jun. 1997, 8 pages, SPIE vol. 3080, 0277-786X/97, SPIE Digital Library.

T.L. Myers et al., "FY 2005 Quantum Cascade Laser Alignment System Final Report," Dec. 2005, 52 pages, PNNL-15600, Pacific Northwest National Laboratory, prepared for the U.S. Department of Energy.

Joe S. Randella et al., "The Integrated Sight: Future Improvement for Land Warrior," Aug. 1998, pp. 62-72, Proceedings of the SPIE—SPIE vol. 3394, The International Society for Optical Engineering, SPIE Digital Library.

Jacob B. Khurgin et al., "Transport and gain in a quantum cascade laser model and equivalent circuit," Nov. 2010, 9 pages, Optical Engineering 49(11), 111110, SPIE Nov. 2010/vol. 49 (11), ©2010 SPIE, SPIE Digital Library.

Shunt Switched Current Control. Applicant admits that this circuit design is prior art and used more than one year prior to Aug. 16, 2010.

QC Current Regulator. Applicant admits that this circuit design is prior art and used more than one year prior to Aug. 16, 2010.

THORLABS, Thorlabs.com-Tunable Lasers:Littrow and Littman Prealigned Kits, OFC Information Sheet 2011, http://www.thorlabs.us/newgrouppage9.cfm?objectgroup_id=4757, ©1999-2011 Thorlabs.

Oleksiy Andrusyak et al., External and common-cavity high spectral density beam combining of high power fiber lasers, Jan. 1, 2008, Proc. of SPIE vol. 6873, SPIE Digital Library.

Thomas Schreiber et al., Incoherent Beam Combining of Continuous-Wave and Pulsed Yb-Doped Fiber Amplifiers, Mar. 1, 2009, vol. 15, No. 2, ©2009 IEEE.

PCT/US2011/028780 filed Mar. 17, 2011, Daylight Solutions, Inc. PCT International Application No. PCT/US2011/028780 and its entire prosecution history**.

PCT/US2011/43065 filed Jul. 6, 2011, Daylight Solutions, Inc. PCT International Application No. PCT/US2011/443065 and its entire prosecution history**.

U.S. Appl. No. 13/177,332, filed Jul. 6, 2011, Daylight Solutions, Inc. U.S. Appl. No. 13/177,332, filed Jul. 6, 2011 and its entire prosecution history**.

U.S. Appl. No. 13/211,186, filed Aug. 16, 2011, Daylight Solutions, Inc. U.S. Appl. No. 13/211,186, filed Aug. 16, 2011 and its entire prosecution history**.

U.S. Appl. No. 13/221,721, filed Aug. 30, 2011, Daylight Solutions, Inc. U.S. Appl. No. 13/221,721, filed Aug. 30, 2011 and its entire prosecution history**.

U.S. Appl. No. 13/237,461, filed Sep. 20, 2011, Daylight Solutions, Inc. U.S. Appl. No. 13/237,461, filed Sep. 20, 2011 and its entire prosecution history**.

U.S. Appl. No. 13/240,889, filed Sep. 22 2011, Daylight Solutions, Inc. U.S. Appl. No. 13/240,889, filed Sep. 22, 2011 and its entire prosecution history**.

U.S. Appl. No. 13/267,787, filed Oct. 6, 2011, Daylight Solutions, Inc. U.S. Appl. No. 13/267,787, filed Oct. 6, 2011 and its entire prosecution history**.

U.S. Appl. No. 13/303,088, filed Nov. 22, 2011, Daylight Solutions, Inc. U.S. Appl. No. 13/303,088, filed Nov. 22, 2011 and its entire prosecution history**.

Wikipedia, Optical switch, from Wikipedia the free encyclopedia, page last modified Mar. 12, 2011, http://en.wikipedia.org/wiki/Optical_switch.

Hildebrandt, L.et al.. "Quantum cascade external cavity laser systems in the mid-infrared spectral range," 2004, Sacher Lasertechnik Group, Marburg, Germany.

Haim Lotem, Mode-hop suppression of Littrow grating-tuned lasers: comment, 20 Month 1994, p. 1, vol. 33, No. 00, Applied Optics.

Corrie David Farmer, "Fab and Eval. of QCL's", Sep. 2000, Faculty of Engineering, University of Glasgow, Glasgow, UK.

M. De Labachelerie and G. Passedat, Mode-hop suppression of Littrow grating-tuned lasers, Jan. 20, 1993, pp. 269-274, vol. 32, No. 3, Applied Optics, ©1993 Optical Society of America.

S. Blaser et al., Alpes Lasers, Room-temperature continuous-wave single-mode quantum cascade lasers, Photonics West 2006, Novel In-Plane Semiconductors V:Quantum Cascade Lasers:6133-01 Switzerland.

Gaetano Scamarcio, Mid-IR and THz Quantum Cascade Lasers, 2005, Physics Dept., University of Bari, Bari Italy.

Gaetano Scamarcio et al., Micro-probe characterization of QCLs correlation with optical performance, APL 78, 1177 & APL 78, 2095 (2001), APL 2002, APL 2004, University of Bari, Bari Italy.

J. Faist, THz and Mid-IR Quantum cascade lasers, QM in space, Chatillon, Mar. 31, Science 2002, University of Neuchatel, EU Projects ANSWER/TERANOVA; Agilent, Funding Swiss National Science Foundation.

Joel M. Hensley, Recent Updates in QCL-based Sensing Applications, Sep. 5-10, 2006, Physical Sciences, Inc., Andover, MA, 2nd International Workshop on Quantum Cascade Lasers, Ostuni, Italy.

J.M. Hensley et al., Demonstration of an External Cavity Terahertz Quantum Cascade Laser, Copyright 2005, Optical Society of America, Washington, DC 20036.

L. Hildebrandt et al., Quantum cascade external cavity and DFB laser systems in the mid-infrared spectral range: devices and applications, 2004, Marburg Germany.

Richard Maulini et al., Broadly tunable external cavity quantum-cascade lasers, 2005, University of Neuchatel, Neuchatel Switzerland.

(56) References Cited

OTHER PUBLICATIONS

Tsekoun, A. et al; "Improved performance of QCL's through a scalable, manufacturable epitaxial-side-down mounting process"; Feb. 2006.

Pushkarsky, M. et al.; "Sub-parts-per-billion level detection of NO2 using room temp. QCLs"; May 2006.

Wirtz, D. et al.; "A tuneable heterodyne infrared spectrometer"; Physikalisches Institut; University of Koln; Koln Germany Spectrochimica 2002.

Williams, B. et al.;"Terahertz QCLs and Electronics"; PhD-MIT 2003.

EPO Extended Search Report for EP 09158585.1 dated Jan. 28, 2011, Daylight Solutions, Inc. (related to U.S. Appl. No. 12/427,364, filed Apr. 2, 2009 and published as US 2010/0111122A1 on May 6, 2010).

Holloway, Stephen A.,Evolution of test and evaluation of infrared missile warning systems, Sep. 19, 2007, XP-002616657, Proc. of SPIE vol. 6737 (2007), downloaded from SPIE Digital Library on Jan. 13, 2011.

US 7,733,928, 06/2010, Marsland, Jr. et al. (withdrawn)

\* cited by examiner

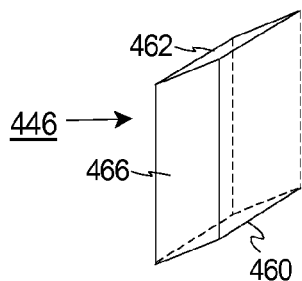
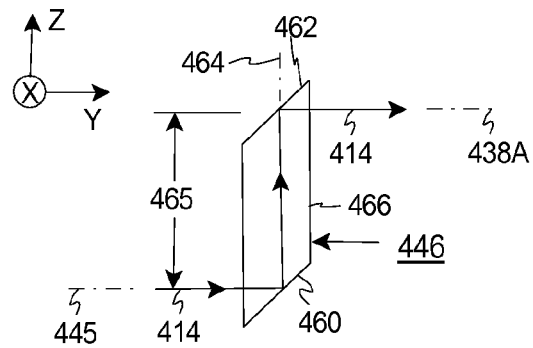
Fig. 4A    Fig. 4B
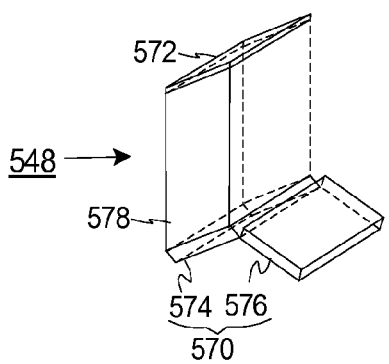
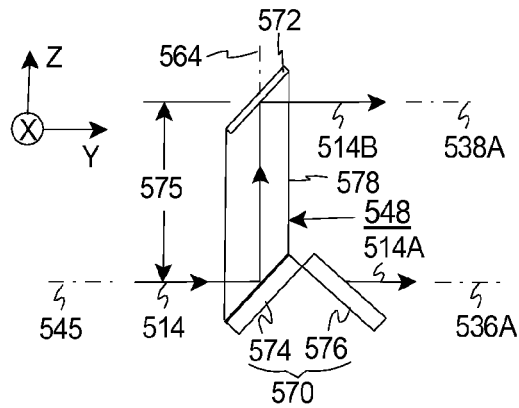
Fig. 5A    Fig. 5B
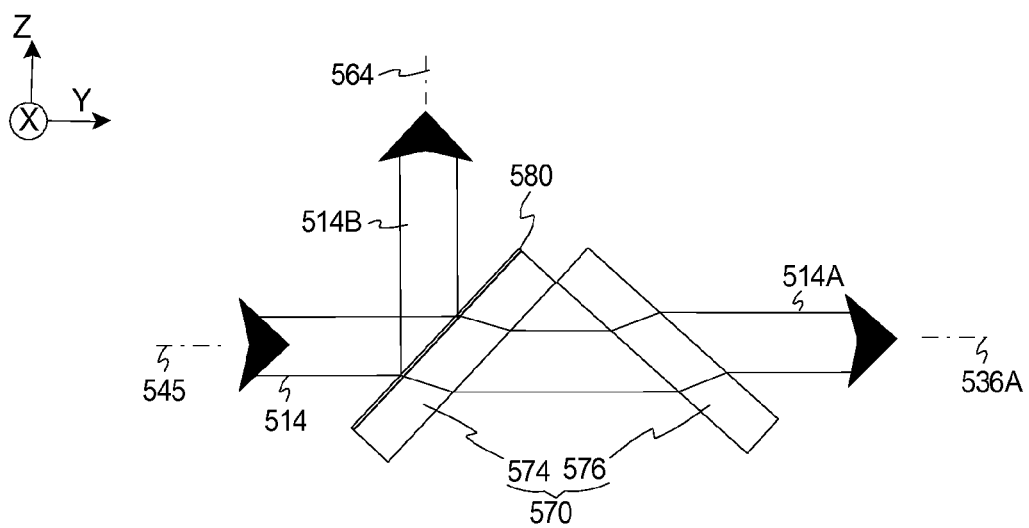
Fig. 5C

MULTIPLE PORT, MULTIPLE STATE OPTICAL SWITCH

RELATED INVENTIONS

This application claims priority on U.S. Provisional Application Ser. No. 61/436,541, filed Jan. 26, 2011 and entitled "MULTIPLE PORT, MULTIPLE STATE OPTICAL SWITCH". As far as is permitted, the contents of U.S. Provisional Application Ser. No. 61/436,541 are incorporated herein by reference.

BACKGROUND

Laser sources that generate laser beams are commonly used in many applications, such as testing, measuring, diagnostics, pollution monitoring, leak detection, security, pointer tracking, jamming infrared seeking missile guidance systems, analytical instruments, homeland security and industrial process control.

Often, many systems require multiple laser beams to perform their required functions. Thus, these systems typically require a separate laser source for each of the required laser beams. Unfortunately, providing a separate laser source for each required laser beam can be expensive to manufacture and maintain, and require a significant amount of space. Accordingly, it would be beneficial to provide a compact system that can direct a laser beam from a single laser source in different directions, e.g., toward different optical fiber cables, so that the single laser source can perform the multiple required functions.

SUMMARY

The present invention is directed toward an optical switch for alternatively directing a source beam directed along an input axis to a first port, a second port, or split the source beam to the first port and the second port. In one embodiment, the optical switch includes a director assembly and a director mover. The director assembly is selectively moveable between (i) a first switch position in which the source beam is passes to the first port, (ii) a second switch position in which the source beam is directed to the second port, and (iii) a dual switch position in which the director assembly splits the source beam into a first beam part that is directed to the first port, and a second beam part that is directed to the second port.

With this design, the optical switch accurately, and selectively directs the source beam to the first port, the second port, or simultaneously split to both ports. As a result thereof, a single light source can be used to alternatively or simultaneously provide the source beam to multiple different devices or components.

In one embodiment, the director assembly includes a second port redirector that redirects the source beam to the second port, and dual redirector that splits the source beam into the first beam part that is directed to the first port, and the second beam part that is directed to the second port. With this embodiment, (i) with the director assembly in the second switch position, the second port redirector is positioned in the path of the source beam, and (ii) with the director assembly in the dual switch position, the dual redirector is positioned in the path of the source beam.

As provided herein, the second port redirector can include (i) an input reflective surface that is positioned in the path of the source beam along the input axis when the redirector assembly is in the second switch position, and (ii) an output reflective surface that is substantially parallel to and spaced apart from the input reflective surface, the input reflective surface being fixedly coupled to the output reflective surface. Further, the dual port redirector can include (i) a beam splitter that is positioned in the path of the source beam along the input axis when the redirector assembly is in the dual switch position, and (ii) an exit reflective surface that is substantially parallel to and spaced apart from the beam splitter, the beam splitter being fixedly coupled to the exit reflective surface.

As provided herein, the beam splitter splits the source beam into the first beam part that transmits through the beam splitter to the first port, and the second beam part that is redirected substantially perpendicular to the input axis. Further, the beam splitter can include (i) a splitter element that splits the source beam into the first beam part and the second beam part, and (ii) a compensator that adjusts the direction of the first beam part after it exits the splitter element.

In one embodiment, the second port redirector and the dual port redirector are not positioned in the path of the source beam when the redirector assembly is in the first switch position.

In one embodiment, the director mover can move and/or rotate the director assembly about a director axis that is substantially parallel to the input axis. For example, the director axis can be substantially perpendicular to the input axis. Alternatively, the director axis can be substantially parallel to the input axis.

Moreover, in certain embodiments, the optical switch can include a locking assembly that selectively locks the director assembly at the first switch position, at the second switch position, and at the dual switch position.

In another embodiment, the director assembly is selectively moveable between (i) the first switch position in which the source beam is directed along a first port axis that is substantially coaxial with the input axis, (ii) the second switch position in which the source beam is directed to a second port axis that is parallel to and spaced apart from the input axis, and (iii) the dual switch position in which the source beam is split into the first beam part that is directed along the first beam axis, and the second beam part that is directed along the second beam axis.

In yet another embodiment, the director assembly includes a redirector periscope and a split periscope. In this embodiment, the director assembly is selectively moveable between (i) the first switch position in which the source beam passes to the first port, (ii) the second switch position in which the redirector periscope is positioned in the path of the source beam to redirect the source beam to the second port, and (iii) the dual switch position in which the split periscope is positioned in the path of the source beam to split the source beam into the first beam part that is directed to the first port and the second beam part that is directed to the second port.

In still another embodiment, the present invention is directed to a method for directing a source beam directed along an input axis to a first port, a second port, or split to the first port and the second port. In this embodiment, the method includes the step of: selectively moving a director assembly between (i) a first switch position in which the source beam passes to the first port, (ii) a second switch position in which the source beam is directed to the second port, and (iii) a dual switch position in which the director assembly splits the source beam into a first beam part that is directed to the first port, and a second beam part that is directed to the second port.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 4A is a perspective view and FIG. 4B is a side view of a second port redirector having features of the present invention;

FIG. 5A is a perspective view and FIG. 5B is a side view of a dual port redirector having features of the present invention;

FIG. 5C is a side view of a portion of the dual port redirection of FIGS. 5A and 5B;

DESCRIPTION

Figure 1:
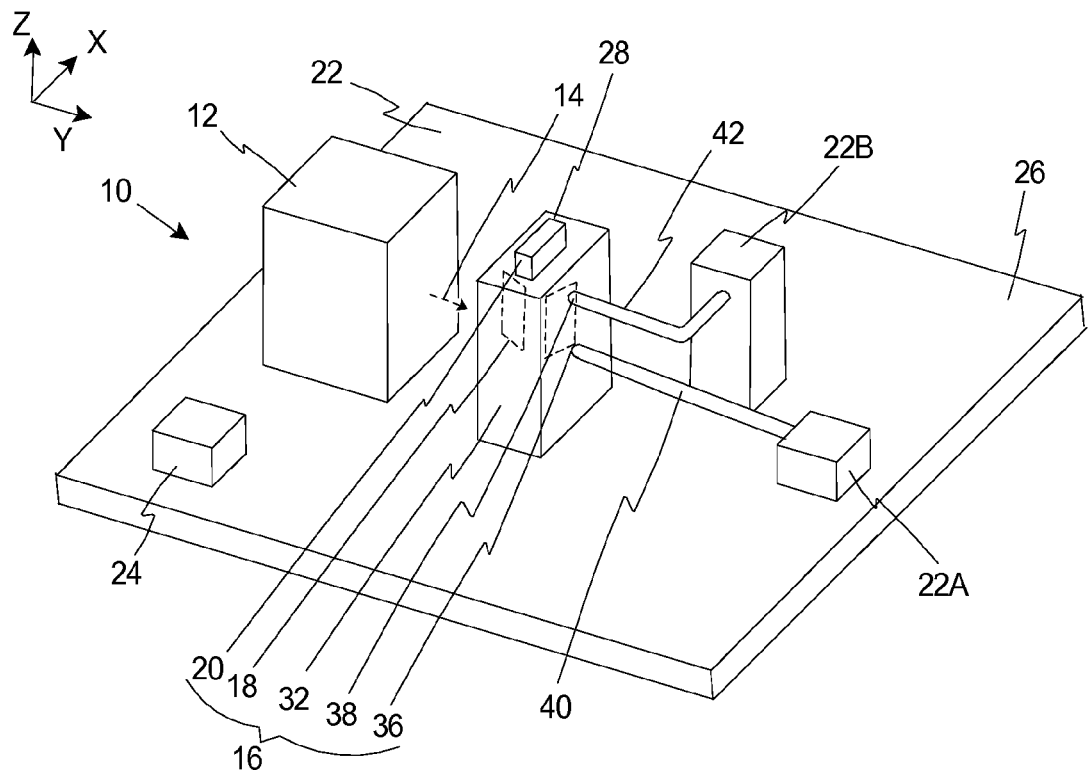
FIG. 1 is simplified perspective view of a light assembly having features of the present invention.

FIG. 1 is simplified perspective view of a light assembly 10, e.g., a laser assembly, which can be used for many things, including but not limited to testing, measuring, diagnostics, pollution monitoring, leak detection, security, pointer tracking, jamming a guidance system, analytical instruments, homeland security and industrial process control. The design of the light assembly 10 can be varied to achieve the functional requirements for the light assembly 10. In the embodiment illustrated in FIG. 1, the light assembly 10 includes (i) a light source 12, e.g., a laser source, which generates a source beam 14 (illustrated as a dashed arrow); (ii) an optical switch 16 including a director assembly 18 (illustrated as a box in phantom) and a director mover 20 (illustrated as a box in phantom) that cooperate to selectively direct the source beam 14 to a first location 22A (illustrated as a box) and/or a second location 22B (illustrated as a box); (iii) a control system 24 that controls the operation of the light source 12 and the optical switch 16; and (iv) a mounting base 26 that retains one or more of these components. It should be noted that in FIG. 1, the light source 12 and the optical switch 16 are shown spaced apart for purposes of clarity and ease of description, and these elements may be closer together in actual use and operation of the light assembly 10.

Alternatively, the light assembly 10 can be designed with more or fewer components than are illustrated in FIG. 1 and/or the arrangement of these components can be different than that illustrated in FIG. 1. Further, the relative size and shape of these components can be different than that illustrated in FIG. 1.

A number of Figures include an orientation system that illustrates an X axis, a Y axis that is orthogonal to the X axis, and a Z axis that is orthogonal to the X and Y axes. It should be noted that these axes can also be referred to as the first, second and third axes.

As an overview, the optical switch 16 is uniquely designed to accurately, and selectively direct the source beam 14 to the first location 22A, to the second location 22B, or split to both locations 22A, 22B. As a result thereof, a single light source 12 can be used to alternatively or simultaneously provide the source beam 14 to multiple different devices or components.

Figure 2:
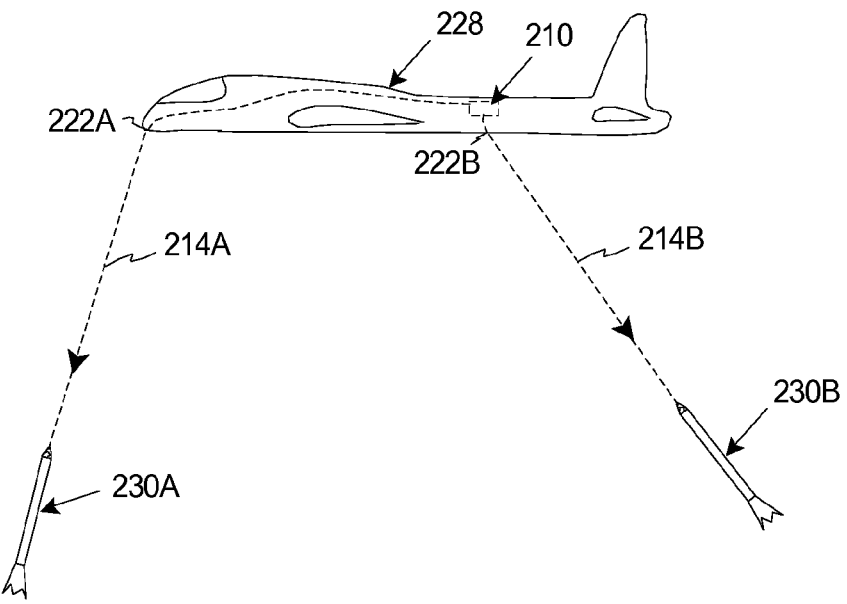
FIG. 2 is a simplified side view of an aircraft including the light assembly illustrated in FIG. 1.

There are a number of possible usages for the light assembly 10 disclosed herein. For example, FIG. 2 illustrates that the light assembly 210 (illustrated in phantom) can be utilized on an aircraft 228 (e.g., a plane or helicopter) with a pointer tracker system (not shown) for protecting the aircraft 228 from a first anti-aircraft missiles 230A and/or a second anti-aircraft 230B that are directed at the aircraft 228. In this embodiment, the light assembly 210 can (i) direct the source beam 14 (illustrated in FIG. 1) to the first location 222A wherein a pointer tracker (not shown) points the source beam 14 at the first anti-aircraft missile 230A; (ii) direct the source beam 14 (illustrated in FIG. 1) to the second location 222B wherein the pointer tracker points the source beam 14 at the second anti-aircraft missile 230B; or (iii) split the source beam 14 into a first beam part 214A and a second beam part 214B, direct the first beam part 214A to the first location 222A wherein a pointer tracker points the first beam part 214A at the first anti-aircraft missile 230A, and direct the second beam part 214B to the second location 222B wherein the pointer tracker points the second beam part 214B at the second anti-aircraft missile 230B.

Stated in another fashion, with the present invention, the optical switch 16 (illustrated in FIG. 1) can be used to direct the beams 214A, 214B to the appropriate location 222A, 222B to launch the beams 214A, 214B from the desired area or areas of the aircraft 228. With this design, the optical switch 16 can be used to control the location(s) 222A, 222B on the aircraft 228 from which the beam(s) 214A, 214B are launched depending upon the approach direction of the missiles 230A, 230B.

It should be noted that the light assembly 210 can be powered by a generator, e.g. the generator for the aircraft 228, a battery, or another power source.

Referring back to FIG. 1, as provided above, the light source 12 generates the source beam 14 (sometimes referred to as the "switch input beam"), and the light source 12 directs the switch input beam 14 toward the optical switch 16. The design of the light source 12 can be varied to achieve the desired wavelength and output power for the source beam 14. For example, the light source 12 can be designed to generate a source beam 14 that is primarily a single wavelength beam or is primarily a multiple wavelength (incoherent) beam. Thus, the characteristics of the source beam 14 can be adjusted to suit the application for the light source 12.

In one embodiment, the light source 12 can include a single laser (not show) that generates the source beam 14, or multiple lasers (not shown) that each generate a laser beam. With multiple lasers, the individual beams can be combined to create the source beam 14. With this design, the number and design of the lasers can be varied to achieve the desired characteristics of the source beam 14 to suit the application for the light assembly 10. For example, in the design with multiple lasers, each individual laser can be tuned so that a specific wavelength of each beam is the same, or so that the specific wavelength of one or more of the beams is different from that of each of the other beams. Alternatively, one or more of the lasers can be electronically adjusted as needed to adjust the wavelength characteristics of the source beam 14.

In certain embodiments, at least a portion of the source beam 14 is within the infrared range, and in certain designs, at least a portion of the source beam 14 is in the mid-infrared range. Moreover, in certain embodiments, the source beam 14 is characterized as being collimated in free space.

In one non-exclusive embodiment, the light source 12 includes one or more mid-infrared ("MIR") lasers (not shown) that each generates a beam having a center wavelength in the MIR range, and one or more non-MIR lasers (not shown) that each generates a beam having a center wavelength that is outside the MIR range, e.g., greater than or less than the MIR range. One example of a suitable MIR laser is a Quantum Cascade laser, and one example of a suitable non-MIR laser is a diode-pumped Thulium-doped fiber laser. A suitable, multiple laser light source 12 is disclosed in U.S. application Ser. No. 12/427,364 filed on Apr. 21, 2009, and entitled "High Output, MID Infrared Laser Source Assembly". As far as permitted, the contents of U.S. application Ser. No. 12/427,364 are incorporated herein by reference.

As provided above, the optical switch 16 alternatively or simultaneously directs the source beam 14 or a portion thereof to the locations 22A, 22B. In one embodiment, the optical switch 16 includes a switch housing 32, the director assembly 18, the director mover 20, a first port 36, and a second port 38 that is spaced apart from the first port 36. For example, each port 36, 38 can be an opening in the switch housing 32. Additionally, the light assembly 10 can include a first optical fiber 40, and a second optical fiber 42. The first optical fiber 40 connects the first port 36 to the first location 22A and transmits light from the first port 36 to the first location 22A, and the second optical fiber 42 connects the second port 38 to the second location 22B and transmits light from the second port 38 to the second location 22B.

Stated in another fashion, laser output is commonly delivered to the consumer via optical fiber. In some applications it is desirable to employ a single laser source and provide the laser user with the three-state-switch 16 enabling the three choices; (i) to direct the entire laser output 14 into the first optical fiber 40 that directs the output to the first location 22A, (ii) to direct the entire laser output 14 into the second optical fiber 42 that directs the output to the second location 22B, and (iii) to split the laser output 14 into two, lower power, outputs and direct both outputs into the first optical fiber 40 and the second optical fiber 40 simultaneously.

Coupling of the laser beam 14 into an optical fiber 40, 42 requires the use of precise and stable opto-mechanical assemblies and high degree of the laser beam alignment stability with respect to the coupling assemblies. Introduction of movable redirecting and splitting optical elements in the optical beam 14 can compromise needed alignment stability principally due to lack of positioning fidelity in the motion control and susceptibility of movable parts to shock and vibration. The present invention discloses a device and method for a simple, compact, and fast motorized opto-mechanical three state optical switch 16, which is substantially insensitive to both motion control errors and shock and vibration.

The switch housing 32 can be rigid and retain the components of the optical switch 16, including the director assembly 18, the director mover 20, and the output ports 36, 38, and a portion of the optical fibers 40, 42. The design of the switch housing 32 can be varied to achieve the design requirements of the optical switch 16.

The control system 24 controls the operation of the other components of the light assembly 10. For example, the control system 24 can include one or more processors and circuits. In certain embodiments, the control system 24 can control the electron injection current to the light source 12, and the control system 24 can control the optical switch 16 to control the position of the redirector assembly 18 and, thus, to control which location 22A, 22B is receiving the source beam 14.

Additionally, in one embodiment, the control system 24 can include circuitry that enables the optical switch 16 to perform individual switching operations within a desired movement time regardless of the temperature and/or environment in which the light assembly 10 and/or the optical switch 16 is operating. Ambient and/or operating temperature and/or other environmental differences can tend to cause the optical switch 16 to operate, i.e. perform switching operations, at different speeds and/or within different time frames. Accordingly, the control system 24 can actively monitor the temperature, the pressure, and/or the speed/time (e.g., rotation rate) of switching operations, and the control system 24 can use that information to change the current supplied to the director mover 20 in order to effectively adjust the torque required to maintain a substantially constant movement time for switching operations.

Figure 3A:
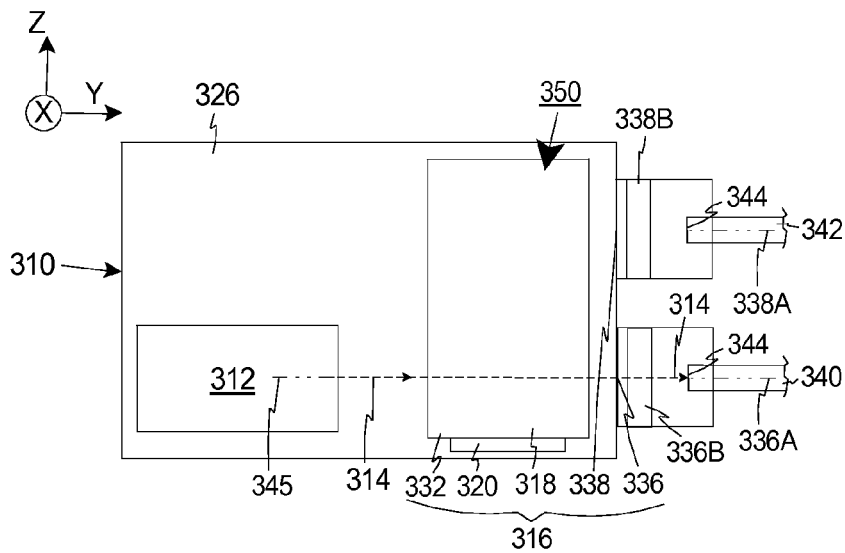
FIGS. 3A-3C are simplified illustrations of a light assembly having features of the present invention with an optical switch positioned at alternative switch positions.
Figure 3B:
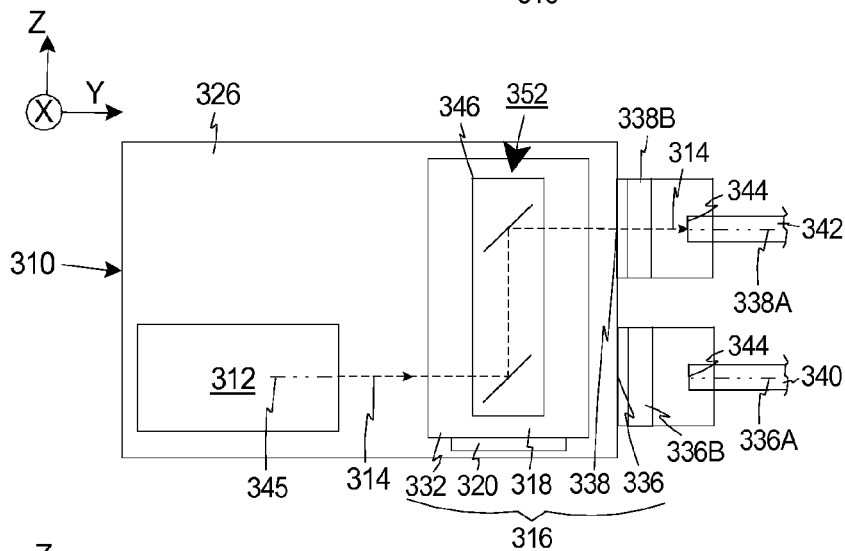
Figure 3C:
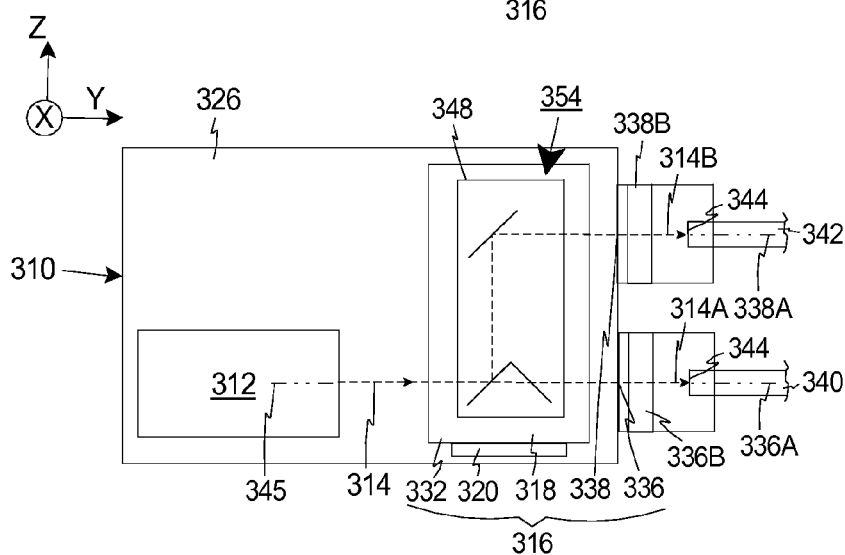

FIG. 3A is a simplified illustration of the light assembly 310 with the optical switch 316 directing the source beam 314 (illustrated with a dashed line) to the first port 336; FIG. 3B is a simplified illustration of the light assembly 310 with the optical switch 316 directing the source beam 314 (illustrated with a dashed line) to the second port 338; and FIG. 3C is a simplified illustration of the light assembly 310 with the optical switch 316 simultaneously directing the first beam part 314A to the first port 336, and the second beam part 314B to the second port 338.

In one embodiment, the light source 312 and the optical switch 316 are mounted to the mounting base 326. In this embodiment, the light source 312 directs and/or launches the source beam 314 along an input axis 345 at the optical switch 316. In FIGS. 3A-3C, the input axis 345 is substantially parallel to the Y axis. Further, in this embodiment, the optical switch 316 includes the switch housing 332, the director assembly 318 (not shown in FIG. 3A for clarity), the director mover 320, the first port 336, and the second port 338 that is spaced apart from the first port 336. Further, a portion of the first optical fiber 340 and a portion of the second optical fiber 342 are illustrated in FIGS. 3A-3C.

In one embodiment, (i) the first port 336 is centered and positioned on a first port axis 336A that is coaxial with the input axis 345; and (ii) the second port 338 is centered and positioned on a second port axis 338A that is parallel to and spaced apart from the input axis 345 and the first port axis 336A. Further, the first port 336 can include a first optical element 336B that is coaxial with the first port axis 336A and that is positioned in front of the first optical fiber 340. Moreover, the second port 338 can include a second optical element 338B that is coaxial with the second port axis 338A and that is positioned in front of the second optical fiber 342.

In one embodiment, each optical element 336B, 338B can be a lens (either spherical or aspherical) having an optical axis that is aligned with the respective port axis 336A, 338A. In one embodiment, to achieve the desired small size and portability, each optical element 336B, 338B has a relatively small diameter. The materials used for the optical element 336B, 338B are selected to be effective for the wavelength(s) of the source beam 314. The optical elements 336B, 338B can be designed to have a numerical aperture (NA) which matches that of the respective optical fiber 340, 342. In one embodiment, each optical element 336B, 338B is secured to the switch housing 332.

Each of the optical fibers 340, 342 includes a fiber inlet 344. In certain embodiments, each fiber inlet 344 can have an inlet facet that is coated with an AR (anti-reflection) material. The AR coating allows the beam to easily enter the respective facet. This improves the efficiency of the coupling, and reduces the amount of heat that is generated. Further, the AR coating ensures that the majority of the power generated by the light source 312 is transferred to the optical fibers 340, 342. In one embodiment, the AR coating has a relatively low reflectivity at the wavelength(s) of the source beam 314. In alternative, non-exclusive embodiments, the AR coating can have a reflectivity of less than approximately 1, 2, 3, 4, or 5 percent for the wavelength(s) of the source beam 314.

In one embodiment, the optical fibers 340, 342 and the optical elements 338A, 338B are fixedly and rigidly secured to the mounting base 326. Further, the light source 312 and the optical switch 316 are fixedly secured to the rigid mounting base 326. As a result thereof, the assembly is rigid and stable even if jarred or vibrated.

The materials utilized and the recipe for each of the coatings can be varied according to the wavelengths of the source beam 314. Suitable materials for the coatings include silicone, germanium, metal-oxides, and/or metal flourides. Further, the recipe for each of the coatings can be developed using the commercially available coating design program sold under the name "The Essential Macleod", by Thin Film Center Inc., located in Tucson, Ariz.

In one embodiment, the director assembly 318 includes a second port redirector 346 (only illustrated in FIG. 3B for clarity) and a dual port redirector 348 (only illustrated in FIG. 3C for clarity). Further, as provided herein, the director assembly 318 is selectively and alternatively movable between (i) a first switch position 350 (illustrated in FIG. 3A), (ii) a second switch position 352 (illustrated in FIG. 3B), and (iii) a dual switch position 354 (illustrated in FIG. 3C).

In the first switch position 350, the second port redirector 346 and the dual port redirector 348 are moved away from the input axis 345 and away from input axis 345 and the incoming source beam 314. It should be noted that for clarity, the second port redirector 346 and the dual port redirector 348 are not illustrated in FIG. 3A to represent that in the first switch position 350, the second port redirector 346 and the dual port redirector 348 are positioned away from the input axis 345 and not in the path of the incoming source beam 324. In certain embodiments, in the first switch position 350, there are no redirecting optics of the optical switch 316 in the path of the source beam 314, and the source beam 314 simply impinges onto the first optical element 336B which focus the source beam 314 onto the first optical fiber 340.

As a result thereof, the source beam 314 passes along the input axis 345 and the first port axis 336A to the first port 336, where the source beam 314 is focused by the first optical element 336B on the fiber inlet 344 of the first optical fiber 340. Stated in another fashion, in the first switch position 350, the optical switch 316 is designed so that there is no redirecting optics in the path of the source beam 314, and the source beam 12 is simply focused by the first optical element 336B on the first optical fiber 340.

Alternatively, in the second switch position 352, the second port redirector 346 is moved into the path of the source beam 314 along the input axis 345 and the dual port redirector 348 is moved from the input axis 345 and away from the source beam 314. For clarity, the dual port redirector 348 is not illustrated in FIG. 3B to represent that in the second switch position 352, only the second port redirector 346 is in the path of the incoming source beam 324. With this design, the source beam 314 directed at the optical switch 316 is redirected by the second port redirector 346 to the second port 338 and to be coaxial with the second port axis 338A, where the source beam 314 is focused by the second optical element 338B on the fiber inlet 344 of the second optical fiber 342.

Finally, in the dual switch position 354, the dual port redirector 348 is moved into the path of the source beam 314 along the input axis 345 and the second port redirector 346 is moved away from the input axis 345 and away from the source beam 314. For clarity, the second port redirector 346 is not illustrated in FIG. 3C to represent that in the dual switch position 354, only the dual port redirector 348 is in the path of the incoming source beam 324. With this design, the source beam 314 directed at the optical switch 316 is split by the dual port redirector 348 into (i) the first beam part 314A that is directed along the input axis 345 and the first port axis 336A to the first port 336, where the first beam part 314A is focused by the first optical element 336B on the fiber inlet 344 of the first optical fiber 340; and (ii) the second beam part 314B that is directed by the dual port redirector 348 to the second port 338 and to be coaxial with the second port axis 338A, where the second beam part 314B is focused by the second optical element 338B on the fiber inlet 344 of the second optical fiber 342.

Thus, with the present invention, the optical switch 316 is able to alternatively and selectively direct (i) the source beam 314 to the first port 336, (ii) the source beam 314 to the second port 338, or (iii) the first beam part 314A to the first port 336, and the second beam part 314B to the second port 338. With this design, a user can choose to direct the source beam 314 in one of three discrete states: (i) all the source beam 314 (laser optical power) is coupled into the first optical fiber 340, (ii) all the source beam 314 (laser optical power) is coupled into the second optical fiber 342, or (iii) the source beam 314 (laser optical power) is split evenly (or unevenly) and coupled into both optical fibers 340, 342.

The director mover 320 selectively and alternatively moves the director assembly 318 between the first switch position 350, the second switch position 352, and the dual switch position 354. The design of the director mover 320 can be varied to suit the specific requirements of the light assembly 310 and/or the optical switch 316. As non-exclusive examples, the director mover 320 can be a rotary motor, a stepper motor, a DC motor, a voice coil, or another type of actuator.

The design of the second port redirector 346 can be varied pursuant to the teachings provided herein. FIG. 4A is a perspective view and FIG. 4B is a side view of one embodiment of a second port redirector 446 that can be used in any of the optical switches provided herein. In this embodiment, the second port redirector 446 is a redirector periscope that includes (i) an input reflective surface 460, and (ii) an output reflective surface 462 that is substantially parallel to (in parallel planes) and spaced apart from the input reflective surface 460 along a redirected axis 464 (e.g. along the Z axis in FIG. 4B). In one embodiment, the redirected axis 464 is substantially perpendicular to the input axis 445. Further, as provided herein, the input reflective surface 460 is spaced apart a redirector separation distance 465 from the output reflective surface 462 along the redirected axis 464.

With this design, when the director assembly 318 (illustrated in FIGS. 3A-3C) is in the second switch position 352 (illustrated in FIG. 3B), the input reflective surface 460 is positioned in the path of the source beam 414 along the input axis 445. In this position, in certain embodiments, the input reflective surface 460 redirects the source beam 414 approximately ninety degrees at the output reflective surface 462, and the output reflective surface 462 redirects the source beam 414 approximately ninety degrees along the second port axis 438A. With this design, in this embodiment, the source beam 414 exiting the second port redirector 446 is approximately parallel to and spaced apart a distance equal to the redirector separation distance 465 from the source beam 414 directed at the second port redirector 446.

In one embodiment, each reflective surface 462, 464 is fully reflective and reflects the source beam 414. Further, in one embodiment, the input reflective surface 460 is at an angle of approximately forty-five degrees relative to the input axis 445, and the output reflective surface 462 is at an angle of approximately forty-five degrees relative to the input axis 445.

In one embodiment, the input reflective surface 460 is fixedly coupled to the output reflective surface 462 so that they move concurrently during movement of the second port redirector 446. For example, the second port redirector 446 can be made from two parallel, spaced apart reflective surfaces 460, 462 (e.g. mirrors) that are fixedly secured together with one or more rigid sides 466. Alternatively, the second port redirector 446 can be a monolithic, rectangular shaped prism, with the parallel reflective surfaces 460, 462 (e.g., mirrors) defining the opposed ends of the prism. Further, in this embodiment, in addition to the reflective surfaces 460, 462 that define the opposed ends, the prism includes four sides 466 that extend between the reflective surfaces 460, 462.

With the designs provided herein, the parallelism of the reflective surfaces 460, 462 is preserved because they are fixed together. This preserves the parallelism of the incident source beam 414 and the source beam 414 exiting the second port redirector 446. Thus, small alignment errors in the position of the second port redirector 446 will not influence the angular pointing of the re-directed source beam 414.

In certain non-exclusive, alternative embodiments, the working surfaces of the second port redirector 446 can be made of germanium, zinc selenide, silicone, calcium fluoride, barium fluoride or chalcogenide glass. The working surfaces can be coated or uncoated (relying on internal total reflection).

Somewhat similarly, the design of the dual port redirector 348 can be varied pursuant to the teachings provided herein. FIG. 5A is a perspective view and FIG. 5B is a side view of one embodiment of a dual port director 548 that can be used in any of the optical switches provided herein. Further, FIG. 5C is a side view of a portion of the dual port direction 548 of FIGS. 5A and 5B. In this embodiment, the dual port redirector 548 is a split periscope that includes a beam splitter 570 and an exit reflective surface 572.

With this design, when the director assembly 318 (illustrated in FIGS. 3A-3C) is in the dual switch position 354 (illustrated in FIG. 3C), the beam splitter 570 is positioned in the path of the source beam 514 along the input axis 545. In this position, the beam splitter 570 splits the source beam 514 into the first beam part 514A that transmits through the beam splitter 570 along the first port axis 536A (substantially coaxial to the input axis 545), and the second beam part 514B that is reflected off of the beam splitter 570 approximately ninety degrees (along the redirected axis 564) at the exit reflective surface 572. The exit reflective surface 572 redirects (e.g. reflects) the second beam part 514B approximately ninety degrees along the second port axis 538A.

In one embodiment, the beam splitter 570 includes (i) a splitter element 574 that splits the source beam 514 into the first beam part 514A and the second beam part 514B, and (ii) a compensator 576 that compensates for the direction of the first beam part 514A after it exits the splitter element 574. For example, the compensator 576 can be a flat window or another type of optical element that will compensate for the lateral shift of the first beam part 514A induced by the splitter element 574 so that the first beam part 514A is directed along the first port axis 536A. Alternatively, in certain designs, the beam splitter 570 can be designed without the compensator 576.

In certain embodiments, the splitter element 574 is a fifty percent beam splitter with the first beam part 514A being approximately equal in intensity to the second beam part 514B. Alternatively, the splitter element 574 could be designed so that one of the beam parts 514A, 514B is more intense than the other beam part 514B, 514A. In one embodiment, the splitter element 574 includes a coating 580 that determines the split of the source beam 514.

In one embodiment, the splitter element 574, and the exit reflective surface 572 are at an angle of approximately forty-five degrees relative to the input axis 545, and the compensator 576 is at an angle of approximately one hundred and thirty five degrees relative to the input axis 545. Further, in one embodiment, the splitter element 574 and the exit reflective surface 572 are spaced apart along the redirected axis 564 (e.g. along the Z axis in FIG. 5B) and are positioned in substantially parallel planes. Additionally, as provided herein, the splitter element 574 is spaced apart a split separation distance 575 from the exit reflective surface 572 along the redirected axis 564.

In certain embodiments, the split separation distance 575 is approximately equal to the redirector separation distance 465 (illustrated in FIGS. 4A and 4B). With this design, both the redirector periscope 446 (illustrated in FIGS. 4A and 4B) and the split periscope 548 will direct at least a portion of the beam to the second port 338 (illustrated in FIGS. 3A-3C).

In one embodiment, the splitter element 574, the compensator 576, and the exit reflective surface 572 are fixedly coupled together so that they move concurrently during movement of the dual port redirector 548. For example, the splitter element 574, the compensator 576, and the exit reflective surface 572 can be separate elements that are fixedly secured together. In one embodiment, the dual port redirector 548 can include one or more sides 578 that fixedly connect the splitter element 574 to the exit reflective surface 572, and the compensator 576 can be attached directly to the splitter element 574. Alternatively, the dual port redirector 548 can be made of a monolithic structure.

With the designs provided herein, the parallelism of the splitter element 574 and the exit reflective surface 572 is preserved because they are fixed together. This preserves the parallelism of the incident source beam 514 and the second beam part 514B exiting the dual port redirector 548. Thus, small alignment errors in the position of the dual port redirector 548 will not influence the angular pointing of the re-directed second beam part 514B.

With the present design, in certain embodiments, (i) the first beam part 514A exiting the dual port director 548 is substantially coaxial with the source beam 514 directed at the dual port redirector 548, and (ii) the second beam part 514B exiting from the dual port director 548 is approximately parallel to and spaced apart a distance equal to the split separation distance 575 from the source beam 514 directed at the dual port redirector 548.

Importantly, with reference to FIGS. 3A-5C, the switch 316 described in present invention gains its insensitivity due to use of the two particular optical assemblies, namely the redirector periscope 446 and the split periscope 548. The redirector periscope 446 consists of the reflective surfaces 460, 462 (two fully reflective mirrors), rigidly fixed and parallel to each other. The split periscope 548 consists of the splitter element 574 (e.g. an optically transparent, partially reflective mirror) and the exit reflective surface 572 (e.g. a fully reflective mirrors). The splitter element 574 has a surface which transmits a fraction of incident laser beam and reflects the remainder of the incident light. The splitter element 574 and the exit reflective surface 572 are rigidly fixed and parallel to each other. The split periscope 548 can utilize an additional optically transparent substrate, the compensator 576, placed behind the splitter element 574 to compensate for the lateral shift of the beam transmitted through the splitter element 574.

The unique property of each periscope 446, 548 is its ability to preserve beam angular pointing of the redirected beam regardless of the orientation of the periscope 446, 548 with respect to the incident beam 14.

Figure 7A:
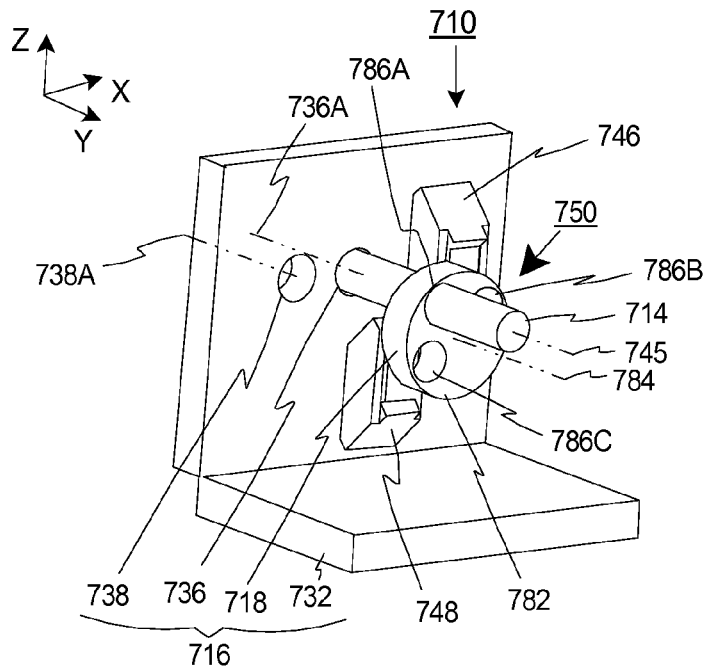
FIGS. 7A-7C are simplified illustrations of an optical switch having features of the present invention at alternative switch positions.
Figure 7B:
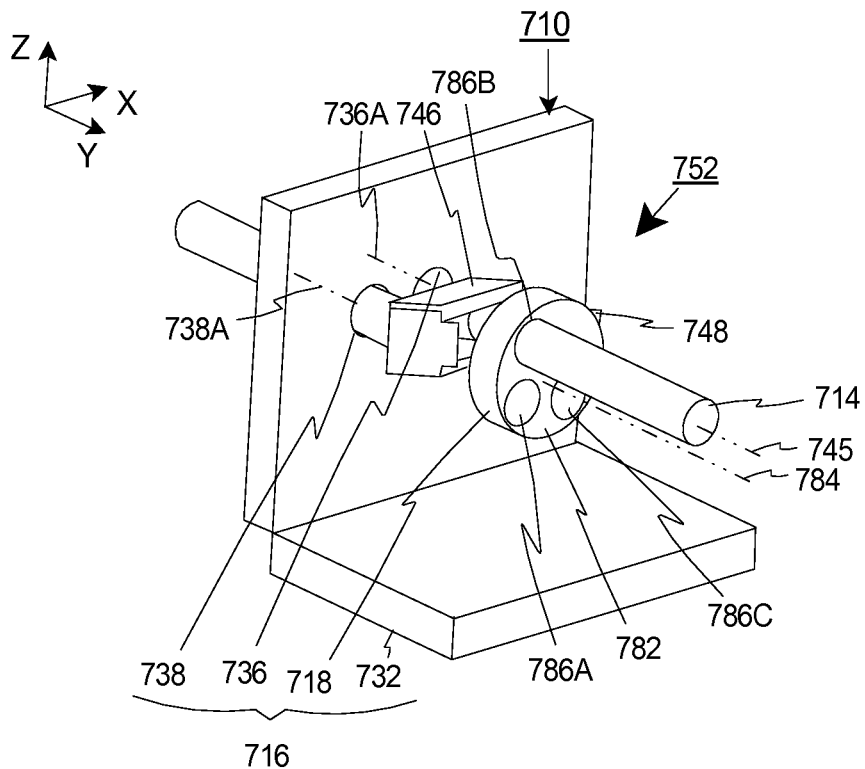
Figure 7C:
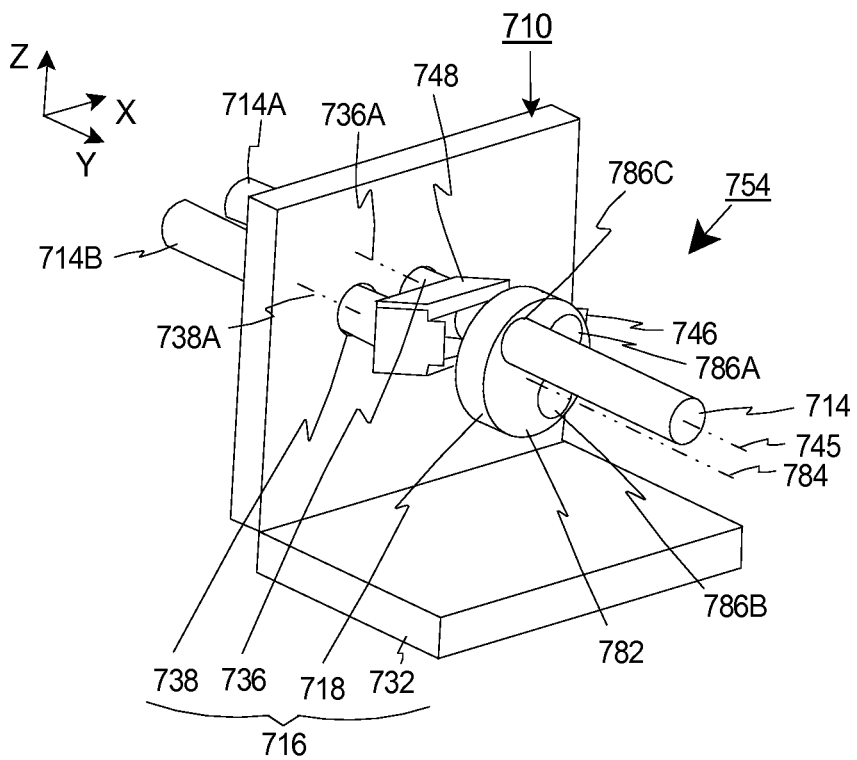

Stated in another fashion, the optical switch 316 described in present invention utilized the redirector periscope 346 and the split periscope 348 rigidly attached to a movable hub 782 (illustrated in FIGS. 7A-7C). The director mover 320 moves the hub 782 between the three discrete positions 350, 352, 354. In the first switch position 350, the incident beam 314 simply passes through. In the second switch position 352, the redirector periscope 346 is moved to intercept the incident beam 314 in a manner that the input reflective surface 460 of the redirector periscope 346 directs the incident beam 314 towards its output reflective surface 462, and the output reflective surface 462 redirects the beam 314 in the original direction of the incident beam 314, while providing lateral displacement of the output beam with respect to the incident beam 314.

In the dual switch position 354, the split periscope 348 is moved to intercept the incident beam 314 in a manner that the splitter element 574 of the split periscope 348 splits the incident beam 314 into the first beam part 314A and the second beam part 314B. The second beam part 314B is directed towards the exit reflective surface 572, and the exit reflective surface 572 redirects the second beam part 314B in the original direction of the incident beam 314, while providing substantially same lateral displacement of the output beam with respect to the incident beam 314 as the redirector periscope 346. At the same time the first beam part 314A (transmitted portion of the incident beam 314) passes through the splitter element 574 and the compensator element 576, and exists the switch 316 in the original direction of the incident beam 314 and substantially collinear with the incident beam 314.

The first optical fiber 340 and the second optical fiber 342 are fixedly attached to the mounting base 326 and the body of the laser 312, with the fiber inlet 344 of the first optical fiber 340 being concentric with the incident beam 314, and the fiber inlet 344 of the second optical fiber 342 being concentric with the redirected beam. Due to immunity of the periscopes 346, 348 to small variations in their positions with respect to the incident beams 314, the coupling efficiency of each optical fiber 340, 342 in each switch position ("state") 350, 352, 354, is substantially insensitive to the position errors and residual motion of the hub 782.

Figure 6A:
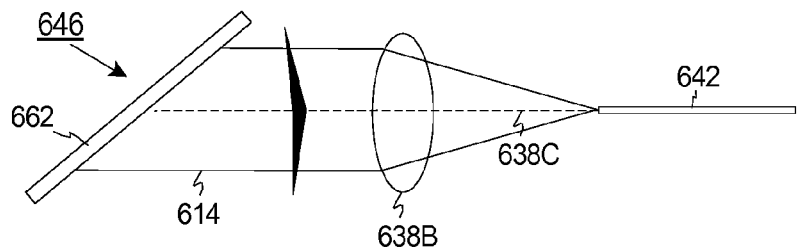
FIGS. 6A-6C are simplified illustrations of an incoming free space source beam and an optical fiber.
Figure 6B:
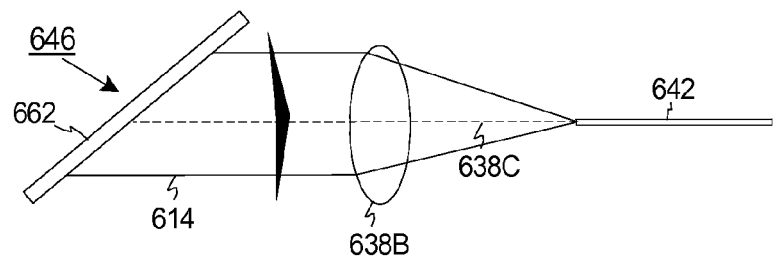

FIG. 6A illustrates a free space, source beam 614 that exited the output reflective surface 662 of the second port redirector 646 and that is focused on the second optical fiber 642 with the second optical element 638B. FIG. 6B also illustrates the free space, source beam 614 that exited the output reflective surface 662 of the second port redirector 646 and that is focused on the second optical fiber 642 with the second optical element 638B.

As provided herein, in order to couple the free space source beam 614 into the optical fiber 642, the incoming free space source beam 614 must be collinear with respect to an optical axis 638C of a second optical element 638B. In FIG. 6A, the free space source beam 614 is coaxial with the optical axis 638C of a second optical element 638B. In contrast, in FIG. 6B, the free space source beam 614 is collinear, but not coaxial with the optical axis 638C of a second optical element 638B. Thus, the source beam 614 can be shifted along the optical axis 638C of the second optical element 638B and still be directed at the second optical fiber 642 as long as the source beam 614 is collinear with the optical axis 638C of the second optical element 638B. Thus, concentricity of the incident free space beam 614 with the optical axis 638C of the second optical element 638B is not critical to coupling efficiency.

With the unique design of the optical switches provided herein, the source beam 614 exiting the output reflective surface 662 is always parallel to and spaced apart from the source beam (not shown) directed at the second port redirector 646.

It should be noted that the same principles are applicable to the beam directed at the first optical fiber 340 (illustrated in FIGS. 3A-3C).

Figure 6C:
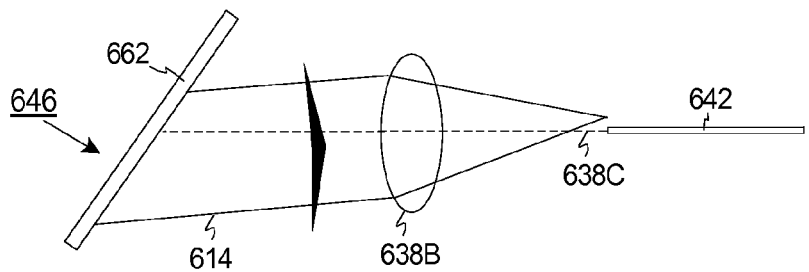

FIG. 6C also illustrates a free space, source beam 614 that exited the output reflective surface 662 of the second port redirector 646 and that is not properly focused on the second optical fiber 642 by the second optical element 638B. As illustrated in FIG. 6C, if the source beam 614 is non-collinear with the optical axis 638C of the second optical element 638B, the source beam 614 will not be directed at the second optical fiber 642.

FIG. 7A is a simplified perspective view of a portion of the light assembly 710 with the optical switch 716 directing the source beam 714 to the first port 736; FIG. 7B is a simplified perspective view of the portion of the light assembly 710 with the optical switch 716 directing the source beam 714 to the second port 738; and FIG. 7C is a simplified perspective view of the portion of the light assembly 710 with the optical switch 716 simultaneously directing the first beam part 714A to the first port 736, and the second beam part 714B to the second port 738.

In this embodiment, the source beam 714 is directed along the input axis 745 at the optical switch 716. Further, in this embodiment, the optical switch 716 includes the switch housing 732 (sometimes referred to as a "mounting base"), the director assembly 718, the director mover 320 (illustrated in FIGS. 3A-3C), the first port 736, and the second port 738 that is spaced apart from the first port 736. It should be noted that the director mover 320 (Illustrated in FIG. 3A-3C), the optical elements 336B, 338B (Illustrated in FIG. 3A-3C), and the optical fibers 340, 342 (Illustrated in FIG. 3A-3C) are not shown in FIGS. 7A-7C for clarity. However, in this embodiment, the optical fibers 340, 342 and the optical elements 336B, 338B would be rigidly secured to the rigid switch housing 732 so that the assembly would be accurate even if jarred or vibrated.

In this embodiment, (i) the first port 736 is positioned on the first port axis 736A that is coaxial with the input axis 745; and (ii) the second port 738 is positioned on a second port axis 738A that is parallel to and spaced apart from the input axis 745 and the first port axis 736A. In this embodiment, each port 736, 738 is an aperture in the switch housing 732.

Moreover, the director assembly 718 includes a director housing 782 (sometimes referred to as a "hub"), the second port redirector 746, and the dual port redirector 748. In this embodiment, the second port redirector 746 and the dual port redirector 748 are secured to the director housing 782, and the director housing 782 is selectively rotated about a director axis 784 with the director mover 320 between (i) the first switch position 750 (illustrated in FIG. 7A), (ii) the second switch position 752 (illustrated in FIG. 7B), and (iii) the dual switch position 754 (illustrated in FIG. 7C). In this embodiment, the director axis 784 is parallel to and spaced apart from the input axis 745.

In one embodiment, each port redirector 746, 748 is rigidly attached to the director housing 782. As a result thereof, the assembly is less influenced by vibration and shock.

In FIGS. 7A-7C, the director housing 782 is generally circular disk shaped and includes (i) a first passageway 786A that allows the source beam 714 to pass to the first port 736 when the director assembly 718 is in the first switch position 750; (ii) a second passageway 786B that allows the source beam 714 to impinge on the second port redirector 746 when the director assembly 718 is in the second switch position 752; and (iii) a third passageway 786C that allows the source beam 714 to impinge on the dual port redirector 748 when the director assembly 718 is in the dual switch position 754.

Similar to the embodiments provided above, in the first switch position 750, the second port redirector 746 and the dual port redirector 748 are moved away from the input axis 745 and away from the path of the source beam 714. As a result thereof, the source beam 714 passes along the input axis 745 and the first port axis 736A to the first port 736.

Alternatively, in the second switch position 752, the second port redirector 746 is moved into the path of the source beam 714 along the input axis 745 and the dual port redirector 748 is positioned away from the input axis 745 and away from the source beam 714. With this design, the source beam 714 directed at the optical switch 716 is redirected by the second port redirector 746 to the second port 738 and to be coaxial with the second port axis 738A.

Finally, in the dual switch position 754, the dual port redirector 748 is moved into the path of the source beam 714 along the input axis 745, and the second port redirector 746 is positioned away from the input axis 745 and away from the source beam 714. With this design, the source beam 714 directed at the optical switch 716 is split by the dual port redirector 748 into (i) the first beam part 714A that directed along the input axis 745 and the first port axis 736A to the first port 736; and (ii) the second beam part 714B that is directed by the dual port redirector 748 to the second port 738 and to be coaxial with the second port axis 738A.

Thus, with the present invention, the optical switch 716 is able to alternatively and selectively direct (i) the source beam 714 to the first port 736, (ii) the source beam 714 to the second port 738, or (iii) the first beam part 714A to the first port 736, and the second beam part 714B to the second port 738.

Figure 8A:
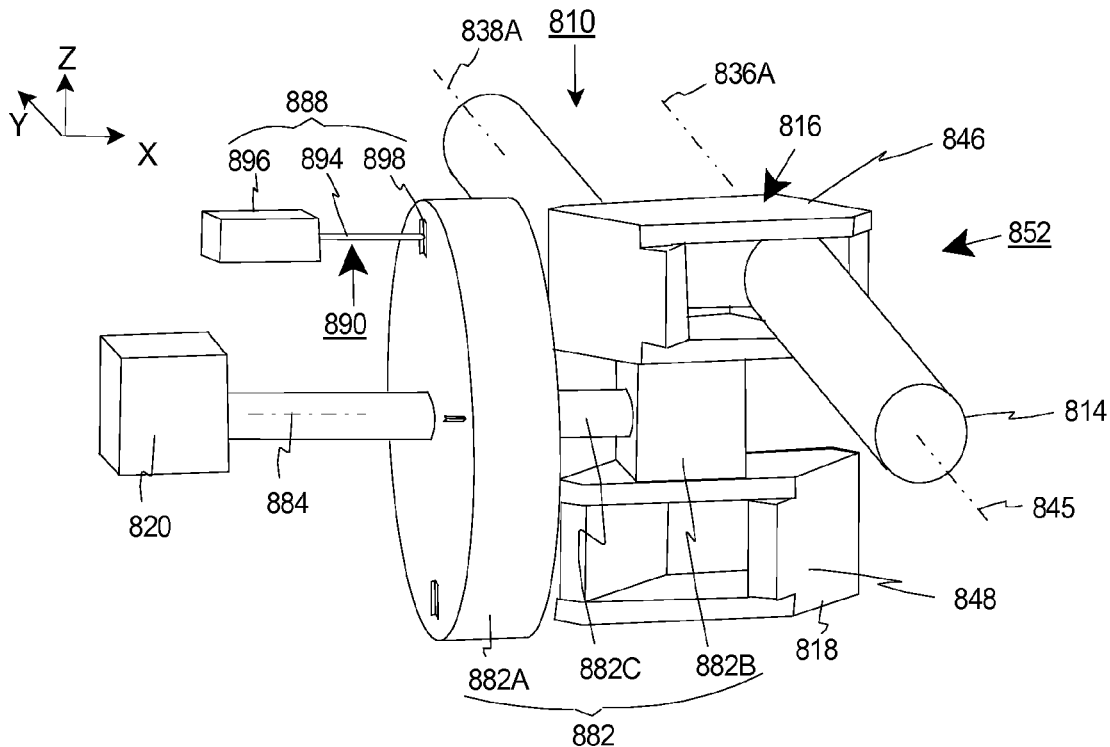
FIGS. 8A and 8B are simplified illustrations of another embodiment of an optical switch having features of the present invention at alternative switch positions.
Figure 8B:
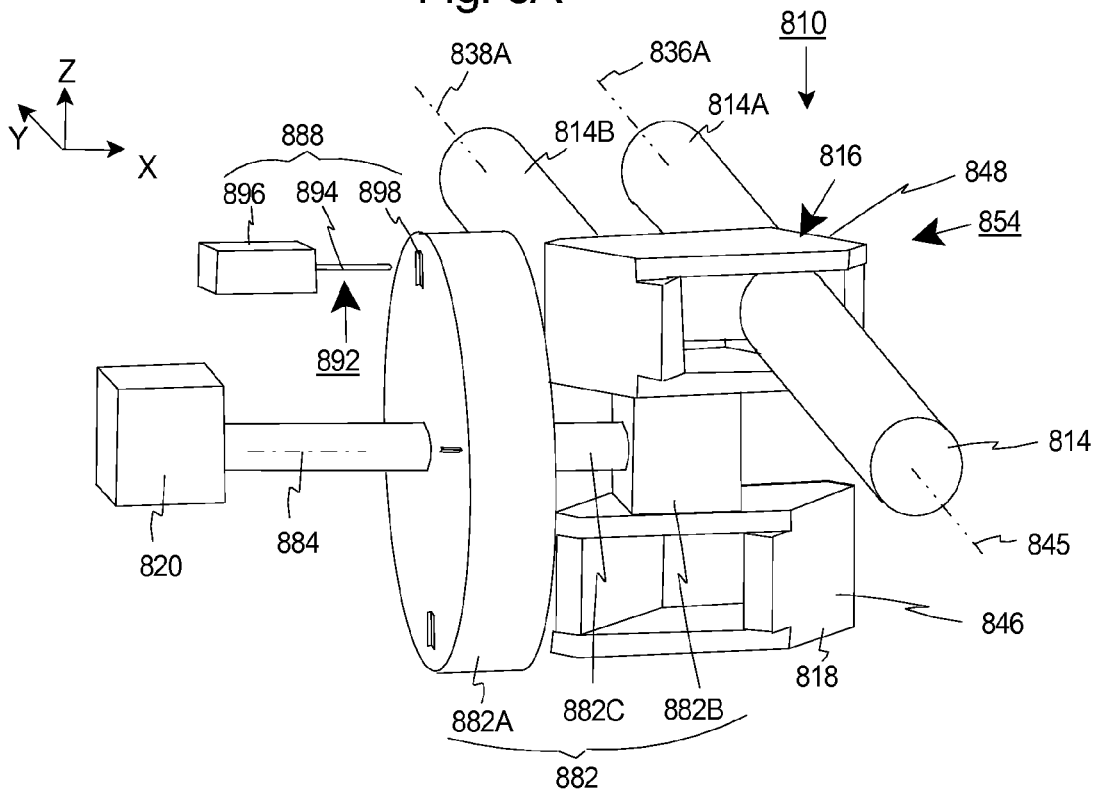

FIG. 8A is a simplified perspective view of a portion of the light assembly 810 with the optical switch 816 redirecting the source beam 814 to the second port axis 838A; and FIG. 8B is a simplified perspective view of the portion of the light assembly 810 with the optical switch 816 simultaneously directing the first beam part 814A along the first port axis 836A, and the second beam part 814B along the second port axis 838A. In this embodiment, the source beam 814 is directed along the input axis 845 at the optical switch 816. Further, in this embodiment, (i) the first port axis 836A is coaxial with the input axis 845; and (ii) the second port axis 838A that is parallel to and spaced apart from the input axis 845 and the first port axis 836A.

Moreover, the director assembly 818 can includes a director frame 882 (sometimes referred to as a "hub"), the second port redirector 846, and the dual port redirector 848. In this embodiment, the second port redirector 846 and the dual port redirector 848 are secured to the director frame 882, and the director frame 882 is selectively rotated about a director axis 884 with the director mover 820 between (i) the first switch position (not shown for this embodiment), (ii) the second switch position 852 (illustrated in FIG. 8A), and (iii) the dual switch position 854 (illustrated in FIG. 8B). In this embodiment, the director axis 884 is substantially perpendicular to the input axis 745.

In one embodiment, each port redirector 846, 848 is rigidly attached to the director housing 782. As a result thereof, the assembly is less influenced by vibration and other impacts.

In FIGS. 8A and 8B, the director frame 882 includes (i) a generally circular disk region 882A, (ii) a rectangular shaped region 882B that retains the port redirectors 846, 848, and (iii) a connector shaft 882C that connects the disk shaped region 882A to the rectangular shaped region 882B.

Similar to the embodiments provided above, in the first switch position (not shown in FIGS. 8A and 8B), the second port redirector 846 and the dual port redirector 848 are moved away from the input axis 845 and away from the path of the source beam 814. As a result thereof, the source beam 814 passes along the input axis 845 and the first port axis 836A.

Alternatively, in the second switch position 852, the second port redirector 846 is moved into the path of the source beam 814 along the input axis 845 and the dual port redirector 848 is positioned away from the input axis 845 and away from the source beam 814. With this design, the source beam 814 directed at the optical switch 816 is redirected by the second port redirector 846 to the second port axis 838A.

Finally, in the dual switch position 854, the dual port redirector 848 is moved into the path of the source beam 814 along the input axis 845 and the second port redirector 846 is moved away from the input axis 845 and away from the source beam 814. With this design, the source beam 814 directed at the optical switch 816 is split by the dual port redirector 848 into (i) the first beam part 814A that directed along the input axis 845 and the first port axis 836A; and (ii) the second beam part 814B that is directed by the dual port redirector 848 to the second port axis 838A.

Additionally, in the embodiment illustrated in FIGS. 8A and 8B, the optical switch 816 includes a locking assembly 888 that selectively locks the director assembly 818 at the first switch position, at the second switch position 852, and at the dual switch position 854. With this design, power does not have to be directed to the director mover 820 to hold the director assembly 818 at the desired switch position 852, 854. Further, the locking assembly 888 can insure that the director assembly 818 is properly aligned at each switch position 852, 854. It should be noted that the switch lock 888 can be incorporated in any of the embodiments of the optical switch disclosed herein.

The design of the locking assembly 888 can be varied according to the design of the rest of the optical switch 816. In one embodiment, the locking assembly 888 is movable between (i) a locked position 890 (illustrated in FIG. 8A) that inhibits rotation of the director assembly 818; and (ii) an unlocked position 892 (illustrated in FIG. 8B) that allows for rotation of the director assembly 818. In FIGS. 8A and 8B, the locking assembly 888 includes (i) a lock shaft 894; (ii) a shaft mover 896 that selectively moves the lock shaft 894 between the locked position 890 and the unlocked position 892; and (iii) three spaced apart shaft receivers 898 that are positioned in the disk shaped region 882A. For example, each shaft receiver 898 can be a "V" shaped groove. With this design, when the lock shaft 894 is inserted in the respective shaft receiver 898, the director assembly 818 is inhibited from rotating.

Figure 9A:
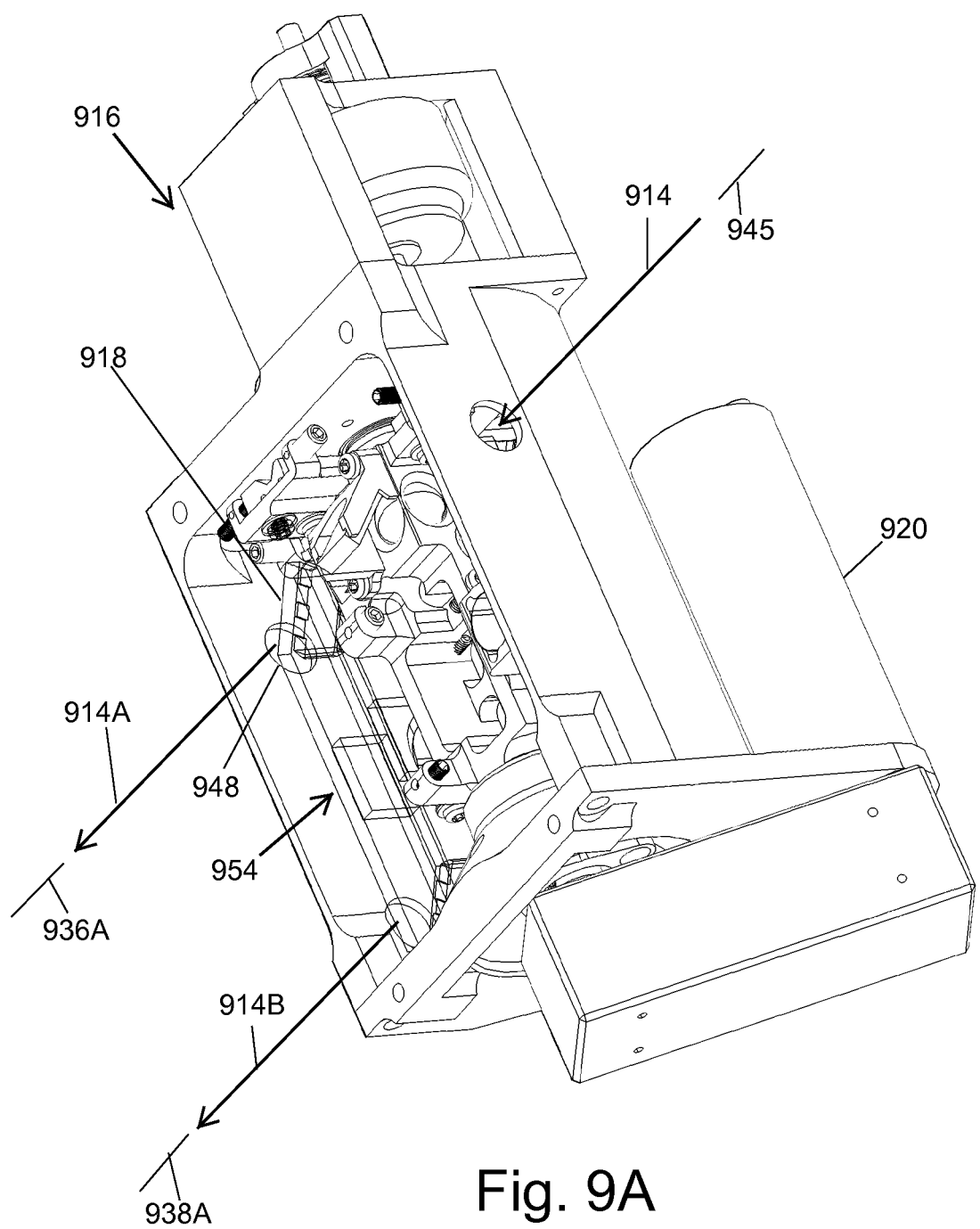
FIGS. 9A and 9B are alternative perspective views.
Figure 9B:
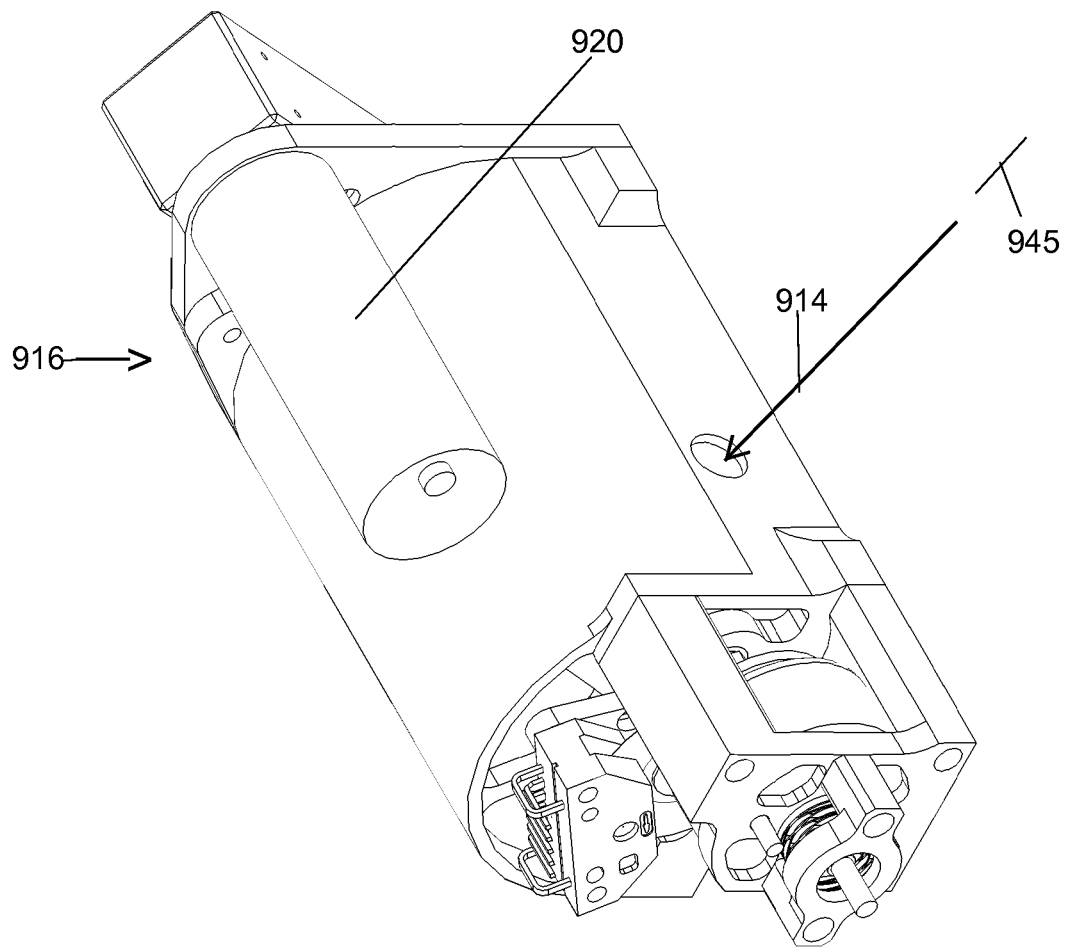
Figure 9C:
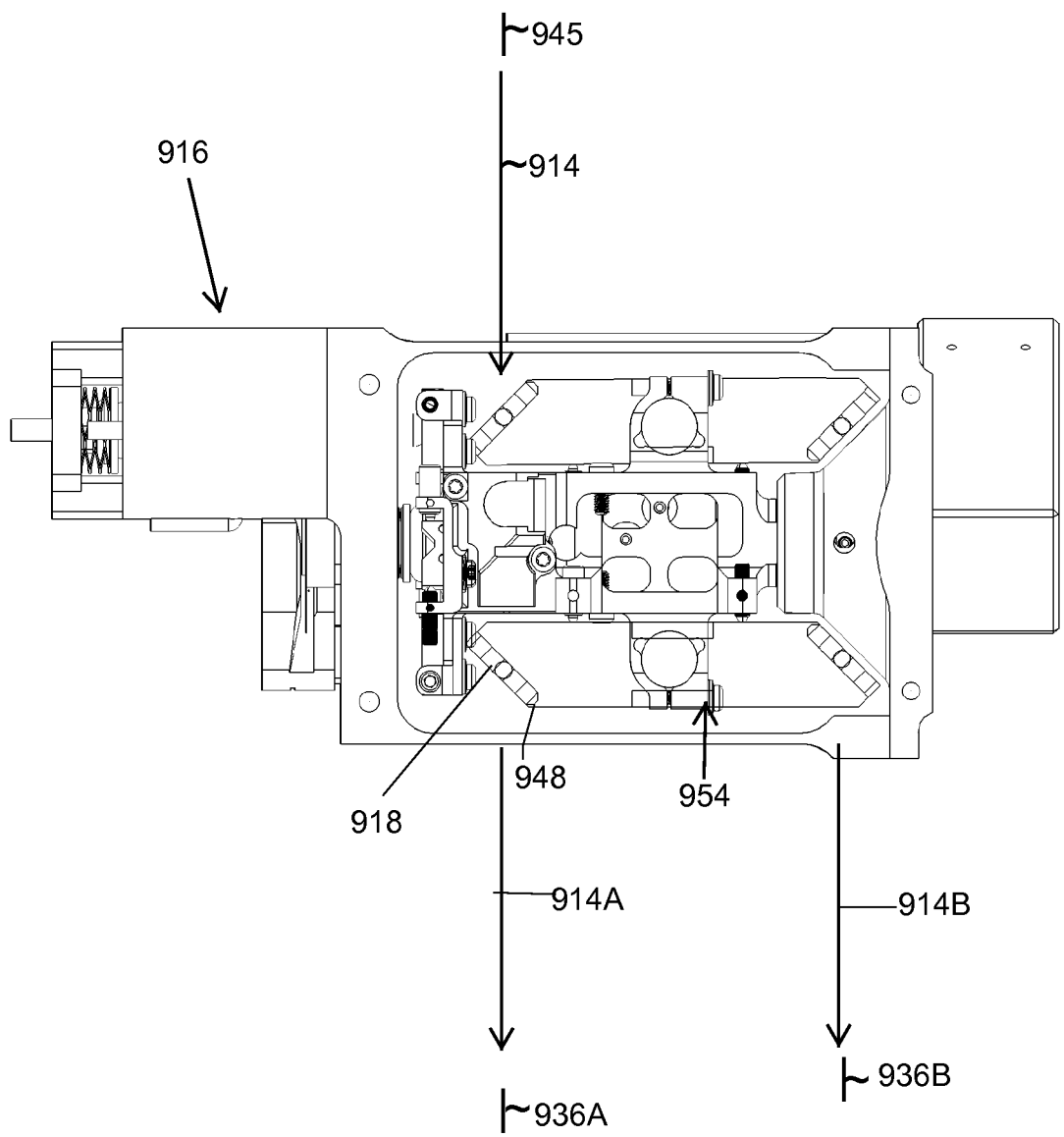
FIG. 9C is a top view of still another embodiment of an optical switch having features of the present invention.

FIGS. 9A and 9B are alternative perspective views, and FIG. 9C is a top view of still another embodiment of an optical switch 916 having features of the present invention. In this embodiment, the source beam 914 is directed along the input axis 945 at the optical switch 916. Further, in this embodiment, (i) the first port axis 936A is coaxial with the input axis 945; and (ii) the second port axis 938A that is parallel to and spaced apart from the input axis 945 and the first port axis 936A.

Moreover, the director assembly 918 includes the second port redirector 946, and the dual port redirector 948. Further, in this embodiment, the director assembly 918 is selectively rotated with the director mover 920 between (i) the first switch position (not shown for this embodiment), (ii) the second switch position (not shown in this embodiment), and (iii) the dual switch position 954.

Similar to the embodiments provided above, in the first switch position (not shown in FIGS. 9A-9C), the second port redirector 946 and the dual port redirector 948 are moved away from the input axis 945 and away from the path of the source beam 914. As a result thereof, the source beam 914 passes along the input axis 945 and the first port axis 936A.

Alternatively, in the second switch position (not shown in FIGS. 9A-9C), the second port redirector 946 is moved into the path of the source beam 914 along the input axis 945 and the dual port redirector 948 is positioned away from the input axis 945 and away from the source beam 914. With this design, the source beam 914 directed at the optical switch 916 is redirected by the second port redirector 946 to the second port axis 938A.

Finally, in the dual switch position 954, the dual port redirector 948 is moved into the path of the source beam 914 along the input axis 945 and the second port redirector 946 is moved away from the input axis 945 and away from the source beam 914. With this design, the source beam 914 directed at the optical switch 916 is split by the dual port redirector 948 into (i) the first beam part 914A that directed along the input axis 945 and the first port axis 936A; and (ii) the second beam part 914B that is directed by the dual port redirector 948 to the second port axis 938A.

It should be noted that any of the embodiments of the optical switch disclosed herein can include a measurement system (not shown) the rotational position of the director assembly and provides feedback to the director mover so that the director mover 20 can accurately position the director assembly. In one, non-exclusive embodiment, the measurement system is a rotary encoder.

While a number of exemplary aspects and embodiments of an optical switch 16 have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. An optical switch that receives a source beam directed along an input axis and alternatively directs the source beam to a first port, a second port, or split to the first port and the second port, the optical switch comprising:
   a director assembly that is selectively moveable between (i) a first switch position in which the source beam passes to the first port, (ii) a second switch position in which the director assembly directs the source beam to the second port, and (iii) a dual switch position in which the director assembly splits the source beam into a first beam part that is directed to the first port, and a second beam part that is directed to the second port.

2. The optical switch of claim 1 wherein the director assembly includes a second port redirector that redirects the source beam to the second port when the director assembly is in the second switch position, and a dual port redirector that splits the source beam and directs the first beam part to the first port and the second beam part to the second port when the director assembly is in the dual switch position.

3. The optical switch of claim 2 wherein in the second switch position, the second port redirector is positioned in the path of the source beam, and wherein in the dual switch position, the dual port redirector is positioned in the path of the source beam.

4. The optical switch of claim 3 wherein the second port redirector includes (i) an input reflective surface that is positioned in the path of the source beam along the input axis when the director assembly is in the second switch position, and (ii) an output reflective surface that is substantially parallel to and spaced apart from the input reflective surface, the input reflective surface being fixedly coupled to the output reflective surface; and wherein the dual port redirector includes (i) a beam splitter that is positioned in the path of the source beam along the input axis when the director assembly is in the dual switch position, the beam splitter splitting the source beam into the first beam part that transmits through the beam splitter to the first port, and the second beam part that is reflected off of the beam splitter, and (ii) an exit reflective surface that is substantially parallel to and spaced apart from the beam splitter, the beam splitter being fixedly coupled to the exit reflective surface.

5. The optical switch of claim 4 wherein the beam splitter includes (i) a splitter element that splits the source beam into the first beam part and the second beam part, and (ii) a compensator that adjusts the direction of the first beam part after it exits the splitter element.

6. The optical switch of claim 1 wherein the director assembly is positioned away from input axis and the path of the source beam when the director assembly is in the first switch position.

7. The optical switch of claim 1 further comprising a director mover that selectively moves the director assembly about a director axis between the first switch position, the second switch position, and the dual switch position; wherein the director axis is substantially parallel to the input axis.

8. The optical switch of claim 1 further comprising a director mover that selectively moves the director assembly about a director axis between the first switch position, the second switch position, and the dual switch position; wherein the director axis is substantially perpendicular to the input axis.

9. The optical switch of claim 1 further comprising a locking assembly that selectively locks the director assembly at the first switch position, at the second switch position, and at the dual switch position.

10. A light assembly comprising a light source that generates a source beam directed along an input axis, and the optical switch of claim 1 that alternatively directs the source beam to a first port, a second port, or splits the source beam to the first port and the second port.

11. An optical switch that receives a source beam directed along an input axis and alternatively directs the source beam, the optical switch comprising:
   a director assembly that is selectively moveable between (i) a first switch position in which the source beam is directed along a first port axis that is substantially coaxial with the input axis, (ii) a second switch position in which the source beam is directed to a second port axis that is parallel to and spaced apart from the input axis, and (iii) a dual switch position in which the source beam is split into a first beam part that is directed along the first beam axis, and a second beam part that is directed along the second beam axis.

12. The optical switch of claim 11 wherein the director assembly includes a second port redirector that redirects the source beam to the second port when the director assembly is in the second switch position, and a dual port redirector that splits the source beam and directs the first beam part to the first port and the second beam part to the second port when the director assembly is in the dual switch position.

13. The optical switch of claim 12 wherein in the second switch position, the second port redirector is positioned in the path of the source beam, and wherein in the dual switch position, the dual port redirector is positioned in the path of the source beam.

14. The optical switch of claim 13 wherein the second port redirector includes (i) an input reflective surface that is positioned in the path of the source beam along the input axis when the director assembly is in the second switch position, and (ii) an output reflective surface that is substantially parallel to and spaced apart from the input reflective surface, the input reflective surface being fixedly coupled to the output reflective surface; and wherein the dual port redirector includes (i) a beam splitter that is positioned in the path of the source beam along the input axis when the director assembly is in the dual switch position, the beam splitter splitting the source beam into the first beam part that transmits through the beam splitter to the first port, and the second beam part that is reflected off of the beam splitter, and (ii) an exit reflective surface that is substantially parallel to and spaced apart from the beam splitter, the beam splitter being fixedly coupled to the exit reflective surface.

15. An optical switch that alternatively directs a source beam to a first port, a second port, or split to the first port and the second port, the optical switch comprising:
a director assembly including a redirector periscope and a split periscope, the director assembly being selectively moveable between (i) a first switch position in which the source beam passes to the first port, (ii) a second switch position in which the redirector periscope is positioned in the path of the source beam to redirect the source beam to the second port, and (iii) a dual switch position in which the split periscope is positioned in the path of the source beam to split the source beam into a first beam part that is directed to the first port and a second beam part that is directed to the second port.

16. The optical switch of claim 15 wherein the redirector periscope includes (i) an input reflective surface that is positioned in the path of the source beam along the input axis when the director assembly is in the second switch position, and (ii) an output reflective surface that is substantially parallel to and spaced apart from the input reflective surface, the input reflective surface being fixedly coupled to the output reflective surface; and wherein the split periscope includes (i) a beam splitter that is positioned in the path of the source beam along the input axis when the director assembly is in the dual switch position, the beam splitter splitting the source beam into the first beam part that transmits through the beam splitter to the first port, and the second beam part that is reflected off of the beam splitter, and (ii) an exit reflective surface that is substantially parallel to and spaced apart from the beam splitter, the beam splitter being fixedly coupled to the exit reflective surface.

17. A light assembly comprising (i) a light source that generates a source beam directed along an input axis, (ii) the optical switch of claim 16 that alternatively directs the source beam to a first port, a second port, or splits the source beam to the first port and the second port, (iii) a mounting base that fixedly retains the light source and the optical switch, (iv) a first optical fiber fixedly secured to the mounting base near the first port, the first optical fiber having a fiber inlet that is substantially coaxial with the input axis, and (v) a second optical fiber fixedly secured to the mounting base near the second port, the second optical fiber having a fiber inlet that is substantially coaxial with a second port axis that is parallel to the input axis.

18. A method for directing a source beam directed along an input axis to a first port, a second port, or split to the first port and the second port, the method comprising the step of:
selectively moving a director assembly between (i) a first switch position in which the source beam passes to the first port, (ii) a second switch position in which the source beam is directed to the second port, and (iii) a dual switch position in which the director assembly splits the source beam into a first beam part that is directed to the first port, and a second beam part that is directed to the second port.

19. The method of claim 18 wherein the step of selectively moving the director assembly includes (i) moving a second port redirector into the path of the source beam to redirect the source beam to the second port when the director assembly is in the second switch position, and (ii) moving a dual port redirector into the path of the source beam to split the source beam and direct the first beam part to the first port and the second beam part to the second port when the director assembly is in the dual switch position.

20. The method of claim 19 wherein the step of moving a second port redirector includes (i) moving an input reflective surface into the path of the source beam along the input axis when the director assembly is in the second switch position, and (ii) positioning an output reflective surface substantially parallel to and spaced apart from the input reflective surface, the input reflective surface being fixedly coupled to the output reflective surface; and wherein the step of moving a dual port redirector includes (i) moving a beam splitter into the path of the source beam along the input axis when the director assembly is in the dual switch position, the beam splitter splitting the source beam into the first beam part that transmits through the beam splitter to the first port, and the second beam part that is reflected off of the beam splitter, and (ii) positioning an exit reflective surface substantially parallel to and spaced apart from the beam splitter, the beam splitter being fixedly coupled to the exit reflective surface.

* * * * *